(12) United States Patent
Whitaker

(10) Patent No.: US 10,961,635 B2
(45) Date of Patent: Mar. 30, 2021

(54) COMPOSITIONALLY MODULATED COMPOSITE MATERIALS AND METHODS FOR MAKING THE SAME

(71) Applicant: Modumetal, Inc., Seattle, WA (US)

(72) Inventor: John D. Whitaker, Seattle, WA (US)

(73) Assignee: MODUMETAL, INC., Seattle, WA (US)

( * ) Notice: Subject to any disclaimer, the term of this patent is extended or adjusted under 35 U.S.C. 154(b) by 292 days.

(21) Appl. No.: 14/800,639

(22) Filed: Jul. 15, 2015

(65) Prior Publication Data
US 2015/0315716 A1    Nov. 5, 2015

Related U.S. Application Data

(60) Division of application No. 12/345,129, filed on Dec. 29, 2008, now Pat. No. 9,115,439, which is a
(Continued)

(51) Int. Cl.
*B32B 15/00*    (2006.01)
*C25D 5/18*    (2006.01)
(Continued)

(52) U.S. Cl.
CPC .................. *C25D 5/18* (2013.01); *B32B 5/02* (2013.01); *B32B 5/16* (2013.01); *B32B 5/18* (2013.01);
(Continued)

(58) Field of Classification Search
USPC ........................................................ 428/680
See application file for complete search history.

(56) References Cited

U.S. PATENT DOCUMENTS

| 2,428,033 | A | 9/1947 | Nachtman |
| 2,436,316 | A | 2/1948 | Lum et al. |

(Continued)

FOREIGN PATENT DOCUMENTS

| CN | 1236024 A | 11/1999 |
| CN | 1380446 A | 11/2002 |

(Continued)

OTHER PUBLICATIONS

Cowles, High cycle fatigue in aircraft gas turbines—an industry perspective (Abstract), International Journal of Fracture Apr. 1996, vol. 80, Abstract (Year: 1996).*

(Continued)

*Primary Examiner* — Humera N. Sheikh
*Assistant Examiner* — Mary I Omori
(74) *Attorney, Agent, or Firm* — Seed Intellectual Property Law Group LLP

(57) ABSTRACT

A light-weight composite material with enhanced structural characteristics includes, in one embodiment, a compositionally modulated nanolaminate coating electrically deposited into an open, accessible void structure of a porous substrate. As a result of including a nanolaminate within the void structure, the composite can include a greater amount of nanolaminate material per unit volume than can be achieved by depositing a nanolaminate material solely on a two-dimensional surface. In addition, the nanolaminate material as well as other material electrodeposited to form the composite is compositionally modulated so that discontinuities between layers are minimized and potentially eliminated. The light-weight but structurally enhanced composite material can be used in a number of different applications including, but not limited to, ballistic applications (e.g., armor panels or tank panels), automotive protection applications (e.g., car door panels, racing shells) and sporting
(Continued)

equipment applications (e.g., golf club shafts and tennis racket frames).

15 Claims, 11 Drawing Sheets

Related U.S. Application Data continuation of application No. 11/503,260, filed on Aug. 14, 2006, now abandoned.

(60) Provisional application No. 60/707,548, filed on Aug. 12, 2005.

(51) Int. Cl.
| | |
|---|---|
| *C25D 7/00* | (2006.01) |
| *C25D 5/08* | (2006.01) |
| *C25D 5/10* | (2006.01) |
| *C25D 7/04* | (2006.01) |
| *C25D 15/02* | (2006.01) |
| *F41H 5/04* | (2006.01) |
| *C22C 19/03* | (2006.01) |
| *C22C 19/00* | (2006.01) |
| *C22C 19/07* | (2006.01) |
| *B32B 5/18* | (2006.01) |
| *B32B 5/02* | (2006.01) |
| *B32B 5/16* | (2006.01) |
| *B32B 15/01* | (2006.01) |

(52) U.S. Cl.
CPC ............ *B32B 15/00* (2013.01); *B32B 15/015* (2013.01); *C22C 19/00* (2013.01); *C22C 19/03* (2013.01); *C22C 19/07* (2013.01); *C25D 5/08* (2013.01); *C25D 5/10* (2013.01); *C25D 7/00* (2013.01); *C25D 7/04* (2013.01); *C25D 15/02* (2013.01); *F41H 5/0457* (2013.01); *F41H 5/0478* (2013.01); *A63B 2209/02* (2013.01); *B32B 2264/10* (2013.01); *Y10T 428/12028* (2015.01); *Y10T 428/12479* (2015.01); *Y10T 428/24997* (2015.04)

(56) References Cited

U.S. PATENT DOCUMENTS

| | | | |
|---|---|---|---|
| 2,470,775 | A | 5/1949 | Jernstedt et al. |
| 2,558,090 | A | 6/1951 | Jernstedt |
| 2,642,654 | A | 6/1953 | Ahrens |
| 2,678,909 | A | 5/1954 | Jernstedt et al. |
| 2,694,743 | A | 11/1954 | Ruskin et al. |
| 2,706,170 | A | 4/1955 | Marchese |
| 2,891,309 | A | 6/1959 | Fenster |
| 3,090,733 | A | 5/1963 | Brown |
| 3,255,781 | A | 6/1966 | Gillespie, Jr. |
| 3,282,810 | A | 11/1966 | Odekerken |
| 3,359,469 | A | 12/1967 | Levy et al. |
| 3,362,851 | A | 1/1968 | Dunster |
| 3,483,113 | A | 12/1969 | Carter |
| 3,549,505 | A | 12/1970 | Hanusa |
| 3,616,286 | A | 10/1971 | Aylward et al. |
| 3,633,520 | A | 1/1972 | Stiglich, Jr. |
| 3,716,464 | A | 2/1973 | Kovac et al. |
| 3,753,664 | A | 8/1973 | Klingenmaier et al. |
| 3,759,799 | A | 9/1973 | Reinke |
| 3,787,244 | A | 1/1974 | Schulmeister et al. |
| 3,866,289 | A | 2/1975 | Brown et al. |
| 3,941,674 | A | 5/1976 | Vanmunster |
| 3,994,694 | A | 11/1976 | Clauss et al. |
| 3,996,114 | A | 12/1976 | Ehrsam |
| 4,053,371 | A | 10/1977 | Townley |
| 4,105,526 | A | 8/1978 | Lewellen, Jr. et al. |
| 4,107,003 | A | 8/1978 | Anselrode |
| 4,191,617 | A | 3/1980 | Hurley et al. |
| 4,204,918 | A | 5/1980 | McIntyre et al. |
| 4,216,272 | A | 8/1980 | Clauss |
| 4,246,057 | A | 1/1981 | Janowski et al. |
| 4,284,688 | A | 8/1981 | Stücheli et al. |
| 4,314,893 | A | 2/1982 | Clauss |
| 4,405,427 | A | 9/1983 | Byrd |
| 4,422,907 | A | 12/1983 | Birkmaier et al. |
| 4,461,680 | A | 7/1984 | Lashmore |
| 4,464,232 | A | 8/1984 | Wakano et al. |
| 4,510,209 | A | 4/1985 | Hada et al. |
| 4,519,878 | A | 5/1985 | Hara et al. |
| 4,540,472 | A | 9/1985 | Johnson et al. |
| 4,543,300 | A | 9/1985 | Hara et al. |
| 4,543,803 | A | 10/1985 | Keyasko |
| 4,591,418 | A | 5/1986 | Snyder |
| 4,592,808 | A | 6/1986 | Doubt |
| 4,597,836 | A | 7/1986 | Schaer et al. |
| 4,613,388 | A | 9/1986 | Walter et al. |
| 4,620,661 | A | 11/1986 | Slatterly |
| 4,652,348 | A | 3/1987 | Yahalom et al. |
| 4,666,567 | A | 5/1987 | Loch |
| 4,670,356 | A | 6/1987 | Sato et al. |
| 4,678,552 | A | 7/1987 | Chen |
| 4,678,721 | A | 7/1987 | den Broeder et al. |
| 4,702,802 | A | 10/1987 | Umino et al. |
| H543 | H | 11/1988 | Chen et al. |
| 4,795,735 | A | 1/1989 | Liu et al. |
| 4,834,845 | A | 5/1989 | Muko et al. |
| 4,839,214 | A | 6/1989 | Oda et al. |
| 4,869,971 | A | 9/1989 | Nee et al. |
| 4,885,215 | A | 12/1989 | Yoshioka et al. |
| 4,904,542 | A | 2/1990 | Mroczkowski |
| 4,904,543 | A | 2/1990 | Sakakima et al. |
| 4,923,574 | A | 5/1990 | Cohen |
| 4,975,337 | A | 12/1990 | Hyner et al. |
| 5,043,230 | A | 8/1991 | Jagannathan et al. |
| 5,045,356 | A | 9/1991 | Uemura et al. |
| 5,056,936 | A | 10/1991 | Mahrus et al. |
| 5,059,493 | A | 10/1991 | Takahata |
| 5,073,237 | A | 12/1991 | Bacher et al. |
| 5,079,039 | A | 1/1992 | Heraud et al. |
| 5,156,729 | A | 10/1992 | Mahrus et al. |
| 5,156,899 | A | 10/1992 | Kistrup et al. |
| 5,158,653 | A | 10/1992 | Lashmore et al. |
| 5,190,637 | A | 3/1993 | Guckel |
| 5,228,967 | A | 7/1993 | Crites et al. |
| 5,268,235 | A | 12/1993 | Lashmore et al. |
| 5,300,165 | A | 4/1994 | Sugikawa |
| 5,320,719 | A | 6/1994 | Lasbmore et al. |
| 5,326,454 | A | 7/1994 | Engelhaupt |
| 5,352,266 | A | 10/1994 | Erb et al. |
| 5,378,583 | A | 1/1995 | Guckel et al. |
| 5,413,874 | A | 5/1995 | Moysan, III et al. |
| 5,431,800 | A | 7/1995 | Kirchhoff et al. |
| 5,461,769 | A | 10/1995 | McGregor |
| 5,472,795 | A | 12/1995 | Atita |
| 5,489,488 | A | 2/1996 | Asai et al. |
| 5,500,600 | A | 3/1996 | Moyes |
| 5,547,096 | A | 4/1996 | Kleyn |
| 5,527,445 | A | 6/1996 | Palumbo |
| 5,545,435 | A | 8/1996 | Steffier |
| 5,620,800 | A | 4/1997 | De Leeuw et al. |
| 5,660,704 | A | 8/1997 | Murase |
| 5,679,232 | A | 10/1997 | Fedor et al. |
| 5,738,951 | A | 4/1998 | Goujard et al. |
| 5,742,471 | A | 4/1998 | Barbee, Jr. et al. |
| 5,775,402 | A | 7/1998 | Sachs et al. |
| 5,783,259 | A | 7/1998 | McDonald |
| 5,798,033 | A | 8/1998 | Uemiya et al. |
| 5,800,930 | A | 9/1998 | Chen et al. |
| 5,828,526 | A | 10/1998 | Kagawa et al. |
| 5,912,069 | A | 6/1999 | Yializis et al. |
| 5,930,085 | A | 7/1999 | Kitade et al. |
| 5,942,096 | A | 8/1999 | Ruzicka et al. |
| 5,952,111 | A | 9/1999 | Sugg et al. |
| 6,036,832 | A | 3/2000 | Knol et al. |
| 6,036,833 | A | 3/2000 | Tang et al. |

(56) References Cited

U.S. PATENT DOCUMENTS

| | | | |
|---|---|---|---|
| 6,051,117 A * | 4/2000 | Novak | C25B 9/00 204/252 |
| 6,071,398 A | 6/2000 | Martin et al. | |
| 6,143,424 A | 11/2000 | Jonte et al. | |
| 6,143,430 A | 11/2000 | Miyasaka et al. | |
| 6,193,858 B1 | 2/2001 | Hradil et al. | |
| 6,203,936 B1 | 3/2001 | Cisar et al. | |
| 6,212,078 B1 | 4/2001 | Hunt et al. | |
| 6,214,473 B1 | 4/2001 | Hunt et al. | |
| 6,284,357 B1 * | 9/2001 | Lackey | C04B 35/52 427/249.1 |
| 6,312,579 B1 | 11/2001 | Bank et al. | |
| 6,344,123 B1 | 2/2002 | Bhatnagar | |
| 6,355,153 B1 | 3/2002 | Uzoh et al. | |
| 6,409,907 B1 | 6/2002 | Braun et al. | |
| 6,415,942 B1 | 7/2002 | Fenton et al. | |
| 6,461,678 B1 | 10/2002 | Chen et al. | |
| 6,466,417 B1 | 10/2002 | Gill | |
| 6,468,672 B1 | 10/2002 | Donovan, III et al. | |
| 6,482,298 B1 | 11/2002 | Bhatnagar | |
| 6,537,683 B1 | 3/2003 | Staschko et al. | |
| 6,547,944 B2 * | 4/2003 | Schreiber | C25D 5/10 205/102 |
| 6,592,739 B1 | 7/2003 | Sonoda et al. | |
| 6,739,028 B2 | 5/2004 | Sievenpiper et al. | |
| 6,777,831 B2 | 8/2004 | Gutiérrez, Jr. et al. | |
| 6,800,121 B2 | 10/2004 | Shahin | |
| 6,884,499 B2 | 4/2005 | Penich et al. | |
| 6,902,827 B2 | 6/2005 | Kelly et al. | |
| 6,908,667 B2 | 6/2005 | Christ et al. | |
| 6,979,490 B2 | 12/2005 | Steffier | |
| 7,581,933 B2 | 9/2009 | Bruce et al. | |
| 7,632,590 B2 | 12/2009 | Punsalan et al. | |
| 7,736,753 B2 | 6/2010 | Deligianni et al. | |
| 8,084,564 B2 | 12/2011 | Kano et al. | |
| 8,152,985 B2 | 4/2012 | Macary | |
| 8,177,945 B2 | 5/2012 | Arvin et al. | |
| 8,192,608 B2 | 6/2012 | Matthews | |
| 8,253,035 B2 | 8/2012 | Matsumoto | |
| 8,585,875 B2 | 11/2013 | Cummings et al. | |
| 8,814,437 B2 | 8/2014 | Braun | |
| 8,916,001 B2 | 12/2014 | Pryce Lewis et al. | |
| 9,005,420 B2 | 4/2015 | Tomantschger et al. | |
| 9,056,405 B2 | 6/2015 | Sato et al. | |
| 9,080,692 B2 | 7/2015 | Tomomori et al. | |
| 9,108,506 B2 | 8/2015 | Whitaker et al. | |
| 9,234,294 B2 | 1/2016 | Whitaker et al. | |
| 9,273,932 B2 | 3/2016 | Whitaker et al. | |
| 9,732,433 B2 | 8/2017 | Caldwell et al. | |
| 9,758,891 B2 | 9/2017 | Bao | |
| 9,938,629 B2 | 4/2018 | Whitaker et al. | |
| 10,041,185 B2 | 8/2018 | Sukenari | |
| 10,253,419 B2 | 4/2019 | Lomasney | |
| 10,266,957 B2 | 4/2019 | Sugawara et al. | |
| 10,472,727 B2 | 11/2019 | Lomasney | |
| 10,513,791 B2 | 12/2019 | Lomasney et al. | |
| 10,544,510 B2 | 1/2020 | Lomasney | |
| 10,662,542 B2 | 5/2020 | Caldwell et al. | |
| 10,689,773 B2 | 6/2020 | Whitaker et al. | |
| 10,781,524 B2 | 9/2020 | Whitaker et al. | |
| 10,808,322 B2 | 10/2020 | Whitaker et al. | |
| 2001/0037944 A1 | 11/2001 | Sanada et al. | |
| 2002/0100858 A1 | 8/2002 | Weber | |
| 2002/0179449 A1 | 12/2002 | Domeier et al. | |
| 2003/0134142 A1 | 7/2003 | Ivey et al. | |
| 2003/0234181 A1 | 12/2003 | Palumbo | |
| 2003/0236163 A1 | 12/2003 | Chaturvedi et al. | |
| 2004/0027715 A1 | 2/2004 | Hixson-Goldsmith et al. | |
| 2004/0031691 A1 * | 2/2004 | Kelly | C23C 28/023 205/104 |
| 2004/0067314 A1 | 4/2004 | Joshi et al. | |
| 2004/0154925 A1 | 8/2004 | Podlaha et al. | |
| 2004/0178076 A1 | 9/2004 | Stonas et al. | |
| 2004/0211672 A1 | 10/2004 | Ishigami et al. | |
| 2004/0234683 A1 | 11/2004 | Tanaka et al. | |
| 2004/0239836 A1 | 12/2004 | Chase | |
| 2005/0002228 A1 | 1/2005 | Dieny et al. | |
| 2005/0109433 A1 | 5/2005 | Danger et al. | |
| 2005/0205425 A1 | 9/2005 | Palumbo et al. | |
| 2005/0221100 A1 | 10/2005 | Kirihara et al. | |
| 2005/0279640 A1 | 12/2005 | Shimoyama et al. | |
| 2006/0135281 A1 | 6/2006 | Palumbo et al. | |
| 2006/0135282 A1 | 6/2006 | Palumbo et al. | |
| 2006/0201817 A1 | 9/2006 | Guggemos et al. | |
| 2006/0243597 A1 | 11/2006 | Matefi-Tempfli et al. | |
| 2006/0269770 A1 | 11/2006 | Cox et al. | |
| 2006/0272949 A1 | 12/2006 | Detor et al. | |
| 2006/0286348 A1 | 12/2006 | Sauer | |
| 2007/0158204 A1 | 7/2007 | Taylor et al. | |
| 2007/0269648 A1 | 11/2007 | Schuh et al. | |
| 2007/0278105 A1 | 12/2007 | Ettel | |
| 2008/0063866 A1 | 3/2008 | Allen et al. | |
| 2008/0093221 A1 | 4/2008 | Basol | |
| 2008/0102360 A1 | 5/2008 | Stimits et al. | |
| 2008/0226976 A1 | 9/2008 | Stimits | |
| 2008/0245669 A1 | 10/2008 | Yoshioka et al. | |
| 2008/0271995 A1 | 11/2008 | Savastiouk et al. | |
| 2009/0004465 A1 | 1/2009 | Kano et al. | |
| 2009/0101511 A1 | 4/2009 | Lochtman et al. | |
| 2009/0130424 A1 | 5/2009 | Tholen et al. | |
| 2009/0130425 A1 | 5/2009 | Whitaker | |
| 2009/0155617 A1 | 6/2009 | Kim et al. | |
| 2009/0283410 A1 | 11/2009 | Sklar et al. | |
| 2010/0116675 A1 | 5/2010 | Sklar et al. | |
| 2010/0187117 A1 | 7/2010 | Lingenfelter et al. | |
| 2010/0304063 A1 | 12/2010 | McCrea et al. | |
| 2010/0304179 A1 | 12/2010 | Facchini et al. | |
| 2010/0319757 A1 | 12/2010 | Oetting | |
| 2011/0162970 A1 | 7/2011 | Sato | |
| 2011/0180413 A1 | 7/2011 | Whitaker et al. | |
| 2011/0186582 A1 | 8/2011 | Whitaker et al. | |
| 2011/0256356 A1 | 10/2011 | Tomantschger et al. | |
| 2011/0277313 A1 | 11/2011 | Soracco et al. | |
| 2012/0118745 A1 | 5/2012 | Bao | |
| 2012/0135270 A1 | 5/2012 | Wilbuer et al. | |
| 2012/0231574 A1 | 9/2012 | Wang | |
| 2012/0282417 A1 | 11/2012 | Garcia et al. | |
| 2013/0052343 A1 | 2/2013 | Dieny et al. | |
| 2013/0071755 A1 | 3/2013 | Oguro | |
| 2013/0075264 A1 | 3/2013 | Cummings et al. | |
| 2013/0130057 A1 | 5/2013 | Caldwell et al. | |
| 2013/0186852 A1 | 7/2013 | Dietrich et al. | |
| 2013/0220831 A1 | 8/2013 | Vidaurre Heiremans et al. | |
| 2013/0224008 A1 | 8/2013 | Cheung et al. | |
| 2013/0323473 A1 | 12/2013 | Dietsch et al. | |
| 2014/0163717 A1 | 6/2014 | Das et al. | |
| 2014/0231266 A1 | 8/2014 | Sherrer et al. | |
| 2015/0322588 A1 | 11/2015 | Lomasney et al. | |
| 2016/0002790 A1 | 1/2016 | Whitaker et al. | |
| 2016/0002803 A1 | 1/2016 | Sklar | |
| 2016/0002806 A1 | 1/2016 | Lomasney | |
| 2016/0002813 A1 | 1/2016 | Lomasney | |
| 2016/0145850 A1 | 5/2016 | Cook et al. | |
| 2016/0159488 A1 | 6/2016 | Roach et al. | |
| 2016/0160863 A1 | 6/2016 | Roach et al. | |
| 2016/0214283 A1 | 7/2016 | Schick et al. | |
| 2017/0191177 A1 | 7/2017 | Whitaker et al. | |
| 2017/0191179 A1 | 7/2017 | Sklar | |
| 2017/0275775 A1 | 9/2017 | Guadarrama Calderon et al. | |
| 2018/0016692 A1 | 1/2018 | Caldwell et al. | |
| 2018/0016694 A1 | 1/2018 | Bao | |
| 2018/0066375 A1 | 3/2018 | Morgan et al. | |
| 2018/0071980 A1 | 3/2018 | Lomasney et al. | |
| 2018/0245229 A1 | 8/2018 | Whitaker et al. | |
| 2019/0309430 A1 | 10/2019 | Sklar | |
| 2019/0360116 A1 | 11/2019 | Collinson et al. | |
| 2020/0115998 A1 | 4/2020 | Lomasney | |
| 2020/0131658 A1 | 4/2020 | Lomasney et al. | |
| 2020/0173032 A1 | 6/2020 | Lomasney | |
| 2020/0277706 A1 | 9/2020 | Lomasney et al. | |
| 2020/0283923 A1 | 9/2020 | Lomasney | |

(56) References Cited

U.S. PATENT DOCUMENTS

| | | |
|---|---|---|
| 2020/0318245 A1 | 10/2020 | Lomasney |
| 2020/0354846 A1 | 11/2020 | Whitaker et al. |

FOREIGN PATENT DOCUMENTS

| | | | |
|---|---|---|---|
| CN | 1924110 A | 3/2007 | |
| CN | 101113527 A | 1/2008 | |
| CN | 101195924 A | 6/2008 | |
| CN | 102148339 A | 8/2011 | |
| DE | 39 02 057 A1 | 7/1990 | |
| DE | 10 2004 006 441 A1 | 12/2005 | |
| EP | 1 826 294 A1 | 8/2007 | |
| EP | 2 189 554 A1 | 5/2010 | |
| JP | S47-002005 | 2/1972 | |
| JP | S47-33925 A | 11/1972 | |
| JP | S52-109439 A | 9/1977 | |
| JP | 58-197292 A | 11/1983 | |
| JP | S58-193386 A | 11/1983 | |
| JP | S58-197292 A | 11/1983 | |
| JP | S60-97774 A | 5/1985 | |
| JP | S61-99692 A | 5/1986 | |
| JP | H01-132793 A | 5/1989 | |
| JP | 2-214618 A | 8/1990 | |
| JP | 5-251849 A | 9/1993 | |
| JP | H06-196324 A | 7/1994 | |
| JP | 7-65347 A | 3/1995 | |
| JP | 2000-239888 A | 9/2000 | |
| JP | 2001-152388 A | 6/2001 | |
| JP | 2001-181893 A | 7/2001 | |
| JP | 2006-035176 | 2/2006 | |
| JP | 2009-215590 A | 9/2009 | |
| KR | 10-2015-0132043 A | 11/2015 | |
| SU | 36121 A1 | 4/1934 | |
| WO | 83/02784 A1 | 8/1983 | |
| WO | 95/14116 A1 | 5/1995 | |
| WO | 1997/00980 A1 | 1/1997 | |
| WO | 1997/039166 A1 | 10/1997 | |
| WO | 2004/001100 A1 | 12/2003 | |
| WO | WO-2005095029 A2 * | 10/2005 | ............. B22F 3/114 |
| WO | 2007/045466 A1 | 4/2007 | |
| WO | 2007/082112 A2 | 7/2007 | |
| WO | 2007/138619 A1 | 12/2007 | |
| WO | 2008/057401 A2 | 5/2008 | |
| WO | 2009/045433 A1 | 4/2009 | |
| WO | 2011/033775 A1 | 3/2011 | |
| WO | 2011/110346 A2 | 9/2011 | |
| WO | 2012/012789 A1 | 1/2012 | |
| WO | 2012/145750 A2 | 10/2012 | |
| WO | 2013/133762 A1 | 9/2013 | |
| WO | 2017/097300 A1 | 6/2017 | |

OTHER PUBLICATIONS

Lekka et al., Corrosion and wear resistant electrodeposited composite coatings, Jun. 24, 2005, Electrochimica Acta, vol. 50, pp. 4551-4556 (Year: 2005).*

Wassim Elias Azzi, A Systematic Study on the Mechanical and Thermal Properties of Open Cell Metal Foams for Aerospace Applications, Fall 2004 (Year: 2004).*

Kitaori et al., machine translation JP H07-65347 Abstract and Description, Mar. 10, 1995 (Year: 1995).*

Adams et al., "Controlling strength and toughness of multilayer films: A new multiscalar approach," J. Appl. Phys. 74 (2) Jul. 15, 1993, 1015-1021.

Alfantazi et al., "Synthesis of nanocrystalline Zn—Ni alloy coatings", JMSLDS 15(15), 1996, 1361-1363.

Beattie et al., "Comparison of Electrodeposited Copper-Zinc Alloys Prepared Individually and Combinatorially," J. Electrochem. Soc., 150(11):C802-C806 (Sep. 25, 2003).

Blum, "The Structure and Properties of Alternately Electrodeposited Metals," paper presented at the Fortieth General Meeting of the American Electrochemical Society, Lake Placid, New York, 14 pages (Oct. 1, 1921).

Cohen et al., "Electroplating of Cyclic Multilayered Alloy (CMA) Coatings," J. Electrochem. Soc., vol. 130, No. 10, Oct. 1983, pp. 1987-1995.

Grimmett et al., "Pulsed Electrodeposition of Iron-Nickel Alloys", J. Electrochem. Soc., vol. 137, No. 11, Nov. 1990 3414-3418.

Igawa et al., "Fabrication of SiC fiber reinforced SiC composite by chemical vapor infiltration for excellent mechanical properties," Journal of Physics and Chemistry of Solids 66 (2005) 551-554.

Jeong et al., "The Effect of Grain Size on the Wear Properties of Electrodeposited Nanocrystalline Nickel Coatings", Scripta Mater. 44 (2001) 493-499.

Jia et al., "*LIGA and Micromolding*" Chapter 4, The MEMS Handbook, 2nd edition, CRC Press, Edited by Mohamed Gad-el-Hak (2006).

Kaneko et al., "Vickers hardness and deformation of Ni/Cu nano-multilayers electrodeposited on copper substrates," Eleventh International Conference on Intergranular and Interphase Boundaries 2004, Journal of Material Science, 40 (2005) 3231-3236.

Karimpoor et al., "Tensile Properties of Bulk Nanocrystalline Hexagonal Cobalt Electrodeposits", Materials Science Forum, vols. 386-388 (2002) pp. 415-420.

Kockar et al., "Effect of potantiostatic waveforms on properties of electrodeposited NiFe alloy films," Eur. Phys. J. B, 42, 497-501 (2004).

Lashmore et al., "Electrodeposited Multilayer Metallic Coatings", Encyclopedia of Materials Science and Engineering, Supp. vol. 1, 1998, 136-140.

Leisner et al., "Methods for electrodepositing composition-modulated alloys," Journal of Materials Processing Technology 58 (1996) 39-44.

Lewis et al., "Stability in thin film multilayers and microlaminates: the role of free energy, structure, and orientation at interfaces and grain boundaries", Scripta Materialia 48 (2003) 1079-1085.

Low et al., "Electrodeposition of composite coatings containing nanoparticles in a metal deposit," Surface & Coatings Technology 201 (2006) 371-383.

"Low-temperature iron plating," web blog article found at http://blog.sina.com.cn/s/blog_48ed0a9c01100024z.html (published Mar. 22, 2006) (English translation attached).

Marchese, "Stress Reduction of Electrodeposited Nickel," Journal of the Electrochemical Society, vol. 99, No. 2, Feb. 1, 1952, p. 39-43.

Meng et al., Fractography, elastic modulus, and oxidation resistance of Novel metal-intermetallic Ni/Ni$_3$Al multilayer films, J. Mater. Res., vol. 17, No. 4, Apr. 2002, 790-796.

Naslain et al., "Synthesis of highly tailored ceramic matrix composites by pressure-pulsed CVI," Solid State Ionics 141-142 (2001) 541-548.

Naslain, "The design of the fibre-matrix interfacial zone in ceramic matrix composites," Composites Part A 29A (1998) 1145-1155.

Nicholls, "Advances in Coating Design for High-Performance Gas Turbines", MRS Bulletin, Sep. 2003, 659-670.

Pilon et al., "Model of Multiple Metal Electrodeposition in Porous Electrodes," Journal of the Electrochemical Society, 153 (5) D85-D90 (2006).

Podlaha et al. "Induced Codeposition : 1. An Experimental Investigation of Ni—Mo Alloys," J. Electrochem. Soc., 143(3):885-892 (1996).

Ross, "Electrodeposited Multilayer Thin Films," *Annual Review of Materials Science*, 24:159-187 (1994).

Sartwell et al., "Replacement of Chromium Electroplating on Gas Turbine Engine Components Using Thermal Spray Coatings", Naval Research Laboratory, Jul. 20, 2005, 207 pages.

Schwartz, "Multiple-Layer Alloy Plating", ASM Handbook, vol. 5: Surface Engineering, 1994, 274-276.

Sherik, "Synthesis, Structure and Properties of Electrodeposited Bulk Nanocrystalline Nickel", Thesis, 1993, 176 pages.

Sperling et al., "Correlation of stress state and nanohardness via heat treatment of nickel-aluminide multilayer thin films", J. Mater. Res., vol. 19, No. 11, Nov. 2004, 3374-3381.

Switzer et al., "Electrodeposited Ceramic Superlattices," Science, vol. 247 (Jan. 26, 1990) 444-446.

(56) References Cited

OTHER PUBLICATIONS

Tench et al., "Considerations in Electrodeposition of Compositionally Modulated Alloys," J. Electrochem. Soc. vol. 137, No. 10, Oct. 1990, pp. 3061-3066.
Vill et al., "Mechanical Properties of Tough Multiscalar Microlaminates," Acta metal. mater. vol. 43, No. 2, pp. 427-437, 1995.
Weil et al., "Pulsed electrodeposition of layered brass structures", Metallurgical and Materials Transactions, vol. 19, No. 6, Jun. 1, 1988, 1569-1573.
Yahalom et al., "Formation of composition-modulated alloys by electrodeposition," Journal of Materials Science 22 (1987) 499-503.
Yang et al., "Effects of SiC sub-layer on mechanical properties of Tyranno-SA/SiC composites with multiple interlayers," Ceramics International 31 (2005) 525-531.
Yang et al., "Enhanced elastic modulus in composition-modulated gold-nickel and copper-palladium foils," Journal of Applied Physics, vol. 48, No. 3, Mar. 1977, 876-879.
Zabludovsky et al., "The Obtaining of Cobalt Multilayers by Programme-Controlled Pulse Current," Transactions of the Institute of Metal Finishing, Maney Publishing, Birmingham, GB, vol. 75, Part 05, Sep. 1, 1997, p. 203-204.
Aizenberg et al., "Skeleton of *Euplectella sp.*: Structural Hierarchy from the Nanoscale to the Macroscale," Science, vol. 309, Jul. 2005, 275-278.
Bakonyi et al., "Electrodeposited multilayer films with giant magnetoresistance (GMR): Progress and problems," Progress in Materials Science, 55 (2010) 107-245.
Bartlett et al., "Electrochemical deposition of macroporous platinum, palladium and cobalt films using polystyrene latex sphere templates," *Chem. Commun.*, 2000, 1671-1672.
Gasser et al., "Materials Design for Acoustic Liners: an Example of Tailored Multifunctional Materials," Advanced Engineering Materials, 2004, 6, No. 1-2, 97-102.
Ghanem et al., "A double templated electrodeposition method for the fabrication of arrays of metal nanodots," Electrochemistry Communications, 6 (2004) 447-453.
Hariyanti, "Electroplating of Cu—Sn Alloys and Compositionally Modulated Multilayers of Cu—Sn—Zn—Ni Alloys on Mild Steel Substrate," Thesis (Jun. 2007).
Keckes et al., "Cell-wall recovery after irreversible deformation of wood," Nature Materials, vol. 2, Dec. 2003, 810-814.
Sanders et al., "Mechanics of hollow sphere foams," Materials Science and Engineering, A347 (2003) 70-85.
Suresh, "Graded Materials for Resistance to Contact Deformation and Damage," Science, vol. 292, Jun. 2001, 2447-2451.
Voevodin et al., "Superhard, functionally gradient, nanolayered and nanocomposite diamond-like carbon coatings for wear protection," Diamond and Related Materials, 7 (1998) 463-467.
Wu et al., "Preparation and characterization of superhard $CN_x$/ZrN multilayers," J. Vac. Sci. Technol. A 15(3), May/Jun. 1997, 946-950.
"Appendix 1: Literature review (Task 1): Literature review concerning the improvement of galvanneal (GA) coating adherence during shear test of adhesively bonded GA steel sheets," 70 pages, no date.
Atanassov et al., "Electrodeposition and properties of nickel-manganese layers," Surface and Coatings Technology 78:144-149, 1996.
Bird et al., "Giant Magnetoresistance in Electrodeposited Ni/Cu and Co/Cu Multilayers," J. Electrochem. Soc. 142(4):L65-L66, 1995.
"Designing with Metals: Dissimilar Metals and the Galvanic Series," printed Oct. 5, 2017, 3 pages.
Despic et al., "Electrochemical Formation of Laminar Deposits of Controlled Structure and Composition," J. Electrochem. Soc. 136(6):1651-1657, 1989.
Dini et al. "On the High Temperature Ductility Properties of Electrodeposited Sulfamate Nickel," Plating and Surface Finishing 65(2):36-40, 1978.
Etminanfar et al., "Corrosion resistance of multilayer coatings of nanolayered Cr/Ni electrodeposited from Cr(III)-Ni(II) bath," Thin Solid Films 520:5322-5327, 2012.
Georgescu et al., "Magnetic Behavior of [Ni/Co—Ni—Mg—N] x N Cylindrical Multilayers prepared by Magnetoelectrolysis," Phys. Stat. Sol. (a) 189(3):1051-1055, 2002.
Harris et al., "Improved Single Crystal Superalloys, CMSX-4® (SLS)[La+Y] and CMSX-486®," TMS (The Minerals, Metals & Materials Society), Superalloys, p. 45-52, 2004.
Huang et al., "Hardness variation and annealing behavior of a Cr—Ni multilayer electroplated in a trivalent chromium-based bath," Surface and Coatings Technology 203:3320-3324, 2009.
Huang et al., "Characterization of Cr—Ni multilayers electroplated from a chromium(III)-nickel(II) bath using pulse current," Scripta Materialia, 57:61-64, 2007.
Ivanov et al., "Corrosion resistance of compositionally modulated multilayered Zn—Ni alloys deposited from a single bath," Journal of Applied Electrochemistry 33:239-244, 2003.
Kalu et al., "Cyclic voltammetric studies of the effects of time and temperature on the capacitance of electrochemically deposited nickel hydroxide," Journal of Power Sources 92:163-167, 2001.
Kirilova et al., "Corrosion behaviour of Zn—Co compositionally modulated multilayers electrodeposited from single and dual baths," Journal of Applied Electrochemistry 29:1133-1137, 1999.
Kruth et al., "Progress in Additive Manufacturing and Rapid Prototyping" CIRP Annals 47(2):525-540, 1998.
Lashmore et al., "Electrodeposited Cu—Ni Textured Superlattices," J. Electrochem. Soc. 135(5):1218-1221, 1988.
Leith et al., "Characterization of Flow-Induced Compositional Structure in Electrodeposited NiFe Composition-Modulated Alloys" J. Electrochem. Soc. 145(8):2827-2833, 1998.
Malone, "New Developments in Electroformed Nickel-Based Structural Alloys," Plating and Surface Finishing 74(1):50-56, 1987.
Onoda et al., "Preparation of amorphous/crystalloid soft magnetic multilayer Ni—Co—B alloy films by electrodeposition," Journal of Magnetism and Magnetic Materials 126(1-3):595-598, 1993.
Parkin et al., "Oscillations in Exchange Coupling and Magnetoresistance in Metallic Superlattice Structures: Co/Ru, Co/Cr, and Fe/Cr," Physical Review Letters 64(19):2304-2307, 1990.
Rousseau et al., "Single-bath Electrodeposition of Chromium-Nickel Compositionally Modulated Multilayers (CMM) From a Trivalent Chromium Bath," Plating and Surface Finishing, p. 106-110, 1999.
Saleh et al., "Effects of electroplating on the mechanical properties of stereolithography and laser sintered parts," Rapid Prototyping Journal 10(5)305-315, 2004.
Shishkovski, "Laser synthesis of functionally graded meso structures and bulk products," Fizmatlit, Moscow, Russia, pp. 30-38, 2009. (with English Abstract).
Simunovich et al., "Electrochemically Layered Copper-Nickel Nanocomposites with Enhanced Hardness," J. Electrochem. Soc. 141(1):L10-L11, 1994.
Srivastava et al., "Corrosion resistance and microstructure of electrodeposited nickel-cobalt alloy coatings," Surface & Coatings Technology 201:3051-3060, 2006.
Stephenson, Jr., "Development and Utilization of a High Strength Alloy for Electroforming," Plating 53(2): 183-192, 1966.
Tench et al., "Enhanced Tensile Strength for Electrodeposited Nickel-Copper Multilayer Composites," Metallurgical Transactions A (15A):2039-2040, 1984.
Thangaraj et al., "Corrosion behavior of composition modulated multilayer Zn—Co electrodeposits produced using a single-bath technique," J of Appl. Electrochem. 39:339-345, 2009.
Thangaraj et al., "Surface Modification by Compositionally Modulated Multilayered Zn—Fe Coatings," Chinese Journal of Chemistry 26:2285-2291, 2008.
Tokarz et al., "Preparation, structural and mechanical properties of electrodeposited Co/Cu multilayers," phys. stat. sol. (c) 5(11):3526-3529, 2008.
Touchstone Research Laboratory, Ltd., Material Safety Data Sheet, CFOAM Carbon Foams, 2008. (4 pages).
Wearmouth et al., "Electroforming with Heat-Resistant, Sulfur-Hardened Nickel," Plating and Surface Finishing 66(10):53-57, 1979.

(56) References Cited

OTHER PUBLICATIONS

Weil et al., "Properties of Composite Electrodeposits," U.S. Army Research Office, Final Report, Contract No. DAAL03-87-K-0047, 21 pages, 1990.
Wilcox, "Surface Modification With Compositionally Modulated Multilayer Coatings," *The Journal of Corrosion Science and Engineering* 6(Paper 52): 2004 (5 pages).
Yogesha et al., "Optimization of deposition conditions for development of high corrosion resistant Zn—Fe multilayer coatings," *Journal of Materials Processing Technology* 211:1409-1415, 2011.
U.S. Appl. No. 17/024,007, filed Sep. 17, 2020.
Wikipedia, "Gold," URL= http://en.wikipedia.org/wiki/Gold, version modified Nov. 3, 15 pages, 2008.
Wikipedia, "Silver," URL=http://en.wikipedia.org/wiki/Silver, version modified Nov. 3, 12 pages, 2008.
U.S. Appl. No. 16/909,939, filed Jun. 23, 2020.
U.S. Appl. No. 17/050,395, filed Oct. 23, 2020.
U.S. Appl. No. 17/077,970, filed Oct. 22, 2020.

\* cited by examiner

COMPOSITIONALLY MODULATED COMPOSITE MATERIALS AND METHODS FOR MAKING THE SAME

RELATED APPLICATIONS

This application is a division of U.S. application Ser. No. 12/345,129, filed Dec. 29, 2008, which is a continuation of U.S. application Ser. No. 11/503,260, filed Aug. 14, 2006, which claims the benefit of U.S. Provisional Application Number 60/707,548, entitled "Novel Lightweight Composite Materials and Methods for Making the Same," filed on Aug. 12, 2005, each of which applications is incorporated herein by reference in its entirety.

FIELD OF THE DISCLOSURE

The disclosure relates generally to composite materials and methods for making them. Among the embodiments described herein are such materials and methods of making such materials, including methods of making electrodeposited compositionally modulated materials. Embodiments of the materials disclosed herein exhibit exceptional structural to weight characteristics.

BACKGROUND

In general, today's advanced material applications are subjected to environments and stresses, which benefit from unusual combinations of material properties that cannot be met by metal alloys, ceramic compacts, or polymeric materials alone. For example, in ballistic applications, a material is sought which is lightweight and thus fuel efficient, while at the same time provides great impact absorption properties to prevent injury or mechanical failure to an underlying structure designed to be hit by shrapnel or an exploding device. In aircraft or seacraft applications, materials that are strong, light-weight and at the same time corrosion resistant are also sought. To achieve these and other unusual combinations of material properties, composite materials (i.e., a multiphase material that exhibits a significant proportion of properties of its two or more constituent phases) are employed.

There are many types of composite materials. For example, particle-reinforced composite materials, fiber-reinforced composite materials, and structural composite materials or layered composite materials are generally well-known. Each type of composite material can include two or more phases wherein one phase makes up the majority of the material and is known as the matrix material and the second phase (and potentially additional phases) make(s) up a lesser extent of the composite and can be dispersed within the matrix material or layered within the matrix material to form a sandwich. The presence of the second and additional phases affects the material properties of the composite material. That is, the material properties of the composite material are dependent upon the material properties of the first phase and the second phase (and additional phases) as well as the amounts of the included phase forming the composite. Thus, the material properties of a composite can be tailored for a specific application by the selection of specific concentrations of the phases, as well as potentially, the sizes, shapes, distribution, and orientations of the included phases.

In general, a structural composite includes two or more layers of material, wherein one or more of the layers may be formed of a composite material in and of itself (e.g., a fiber-reinforced layer or particle-reinforced layer). Each layer of a structural composite provides a different function or provides a specific material property to the structural composite. For example, in ballistic applications one layer can provide toughness to blunt or plastically deform any sharp projectile, a second layer can provide impact resistance so as to absorb kinetic energy of a ballistic that hits the composite, and a third layer can provide strength so as to maintain structural integrity of the composite even after the composite material has been hit by shrapnel or a projectile. Typically, material transitions between these layers are discontinuous. That is, there is an abrupt change in material properties across an interface formed by two of the layers. It is well known that discontinuities often lead to failures in a composite material. For example, interlaminar failure can occur as a projectile's stress wave travels through a composite plate, impacting each of the interfaces between the layers.

It is also well known that nanolaminate layers may provide enhanced material properties not achievable by their constituent materials on other length scales. For example, certain bimetallic multilayer systems exhibit an anomalous jump in elastic modulus at a specific nanoscale layer thickness, a phenomenon known as the supermodulus effect. In general, to deposit nanoscale multilayers, systems such as DC magnetron sputtering or other deposition techniques that deposit material on top of a substantially flat surface have been utilized.

GLOSSARY AND SUMMARY

The following terms are used throughout this disclosure. "Compositionally Modulated Material" defines a material whose chemical composition can be represented by a periodic function of one or more space coordinates, such as, for example, a growth direction of the material. "Composition Cycle" defines the deposition of one cycle of the compositionally modulated material (i.e., the deposition corresponding to one cycle of the periodic function).

"Electrodeposition" defines a process in which electricity drives formation of a deposit on an electrode at least partially submerged in a bath including a component, which forms a solid phase upon either oxidation or reduction. "Electrodeposited Components" defines constituents of a material deposited using electrodeposition. Electrodeposited components include metal ions forming a metal salt, as well as particles which are deposited in a metal matrix formed by electrodeposition.

"Nanolaminate" defines a material that includes a plurality of adjacent layers that each have a thickness of less than about 100 nanometers.

"Wavelength" defines a length equal to the thickness of a composition cycle "Waveform" defines a time-varying signal.

The disclosure herein provides numerous embodiments relating to composite materials and methods for making them. A few of these embodiments are briefly summarized.

In general, embodiments herein provide composite materials and methods for making them. The composite material includes a compositionally modulated nanolaminate coating electrically deposited into an open, accessible void structure of a porous substrate. As a result of including a nanolaminate within the void structure, the composites can include a greater amount of nanolaminate material per unit volume than can be achieved by depositing a nanolaminate material solely on a two-dimensional surface. In addition, the nanolaminate material as well as other material electrodeposited to form the composites are compositionally modulated in a manner so that discontinuities between layers are minimized or potentially even eliminated.

In one aspect, embodiments described in the present disclosure are also directed to composite materials that include a substrate material defining an accessible interior void structure, and an electrodeposited compositionally modulated material at least partially disposed within the accessible void structure. The electrodeposited compositionally modulated material includes at least one portion of a plurality of composition cycles having wavelengths between about 200 nanometers and 1 nanometer. In certain embodiments, the at least one portion includes a plurality of composition cycles having wavelengths between about 100 nanometers and 1 nanometer. In other embodiments, the at least one portion includes a plurality of composition cycles having wavelengths between about 75 nanometers and 10 nanometers. In other embodiments, the at least one portion includes a plurality of composition cycles having wavelengths between about 60 nanometers and 25 nanometers.

Such embodiments can include one or more of the following features. The composite materials may include wavelengths within the at least one portion that are substantially equivalent. That is, a thickness of each of the layers within the at least one portion can all be described as having a substantially similar or equivalent wavelength. In other embodiments, regions within the electrodeposited compositionally modulated material have a composition that varies continuously, such that discontinuities are masked or substantially or completely eliminated. The composite materials can have enhanced or increased structural properties including an enhanced strength or elastic modulus through the supermodulus effect. In addition to having regions wherein at least one portion of a plurality of composition cycles have wavelengths between 200 nanometers and 1 nanometer, the composite materials can also include one or more regions wherein the composition cycles are greater than 200 nanometers. That is, the composite material can include an electrodeposited material that includes at least one portion wherein the thickness of the deposited layers is 100 nanometers, or less and one or more regions wherein the thickness of the deposited material is greater than 100 nanometers. In some embodiments, the electrodeposited compositionally modulated material includes at least one of nickel, iron, copper, cobalt, gold, silver, platinum and combinations thereof. In certain embodiments, the electrodeposited compositionally modulated material includes a metal matrix material and a plurality of particles disposed within the metal matrix material. The particles can be nanosized particles (e.g., particles having a mean grain size of 200 nm, 100 nm, 75 nm, 50 nm, 30 nm, 20 nm, 15 nm, 10 nm, 5 nm, 4 nm 3 nm, 2 nm, or 1 nm) and in some embodiments, 85% or more (e.g., 87%, 89%, 90%, 93%, 95%, 96%, 97%, 98%, 99%, 100%) of the nanosized particles have an average grain size within a range of 10 nm to 100 nm. In certain embodiments, 85% or more of the nanosized particles have an average grain size within a range of 20 nm to 50 nm, 30 nm to 50 nm, 10 nm to 30 nm, or 1 to 10 nm. In some embodiments, the particles are formed of carbide particles, alumina particles, glass particles, and polymer particles. The electrodeposited compositionally modulated material, in some embodiments, fills at least 10% of the accessible interior void structure. In other embodiments, the compositionally modulated material fills at least 20%, 30%, 40%, 50%, 60%, 70%, 80%, or 90% of the accessible interior void structure. In other embodiments, the compositionally modulated material fills 100% of the accessible interior. The substrate material can be a consolidated material, such as, for example, a foam or a fabric. In other embodiments, the substrate material can be an unconsolidated material, such as, for example, a particle bed or a mass of fiber. The substrate material can be conductive or non-conductive.

In another aspect, embodiments of this disclosure are directed to a composite material that includes a material defining an accessible interior void structure, and an electrodeposited compositionally modulated material at least partially disposed within the accessible void structure. The electrodeposited compositionally modulated material includes a first portion and a second portion having a Vicker's hardness value at least: 10% greater, (e.g. 20%, 30%, 40%, 50%, 60%, 70%, 80%, 90%, 100%, 150%, 200%, 500% or more) than the first portion.

Embodiments of this aspect of the disclosure can include one or more of the following features. In some embodiments, the electrodeposited compositionally modulated material includes at least one of nickel, iron, copper, cobalt, gold, silver, platinum and combination thereof In certain embodiments, the first portion of the electrodeposited compositionally modulated material includes a metal matrix material with a first concentration of particles and the second portion includes the metal matrix with a second concentration of particles, wherein the second concentration of particles is greater than the first concentration. The particles disposed in the metal matrix can be nanosized particles (e.g., particles having a mean grain size of 200 nm, 100 nm, 75 nm, 50 nm, 30 nm, 20 nm, 15 nm, 10 nm, 5 nm, 4 nm 3 nm, 2 nm, or 1 nm) and in some embodiments, 85% or more (e.g., 87%, 89%, 90%, 93%, 95%, 96%, 97%, 98%, 99%, 100%) of the nanosized particles have an average grain size within a range of 10 nm to 100 nm. In certain embodiments, 85% or more of the nanosized particles have an average grain size within a range of 20 nm to 50 nm, 30 nm to 50 nm, 10 nm to 30 nm, or 1 to 10 nm. In some embodiments, the particles are formed of carbide particles, alumina particles, glass particles, and polymer particles. The electrodeposited compositionally modulated material, in some embodiments, fills at least 10% of the accessible interior void structure. In other embodiments, the compositionally modulated material fills at least: 20%, 30%, 40%, 50%, 60%, 70%, 80%, or 90%. In other embodiments, the compositionally modulated material fills substantially (i.e., all or nearly all) 100% of the accessible interior void structure. The substrate material can be a consolidated material, such as, for example, a foam or a fabric. In other embodiments, the substrate material can be an unconsolidated material, such as, for example, a particle bed or a mass of fiber. The substrate material can be conductive or non-conductive.

In another aspect, embodiments of the disclosure are directed to methods for forming a composite. The methods includes providing a preform having an accessible interior void structure, and electrodepositing a nanolaminate coating into the accessible interior void structure to form the composite.

In another aspect, embodiments described herein are directed to methods of forming a composite using electrodeposition. The methods includes providing a bath including at least two electrodepositable components; connecting a porous preform including an accessible interior void structure to a first electrode; inserting the porous preform into the bath; inserting a second electrode into the bath; applying voltage or current to the first electrode with a time varying frequency. The time varying frequency as applied oscillates at least for two cycles (e.g., 2, 3, 4, 5, 10, 20, 30, 50, 100 or more) to deposit a compositionally modulated material within the accessible interior void structure of the porous preform.

In a further aspect, embodiments described herein are directed to methods of forming a composite using electrodeposition. The methods include: (1) flowing a fluid including at least two electrodepositable components through a porous preform having an accessible void structure at a first flow rate, the porous preform being in physical contact with a first electrode; (2) applying a voltage or current between the first electrode and a second electrode to deposit a material at least partially disposed within the void structure, the material including the at least two electrodepositable components; and (3) modulating the flow rate at a time dependent frequency wherein the time dependent frequency oscillates for at least two cycles (e.g., 2, 3, 4, 5, 10, 20, 50, 100 or more) to compositionally modulate the material.

Embodiments of the above methods can also include one or more of the following optional features. One or more steps of controlling pH of the bath, and/or monitoring and/or adjusting the concentration of the at least two electrodepositable components can be included in the methods described above. For example, in one embodiment, the pH of the bath can be monitored and adjusted during application of the voltage or current to the first electrode. Similarly, the concentration of one or more of the at least two electrodepositable components in the bath can be monitored to detect a difference from a predetermined concentration level for forming the compositionally modulated material. Upon detection of a difference from the predetermined level for any of the electrodepositable components, the concentration of that component can be adjusted to eliminate or decrease the detected difference. In some embodiments of the methods, the time varying frequency oscillates according to one of a triangle wave, a sine wave, a square wave, a saw tooth wave, or any combination of the foregoing waveforms. In certain embodiments, the flow rate of the bath and/or an applied voltage or current are modulated at a time varying frequency. The bath can include any transition metal, such as, for example, nickel, iron, copper, gold, silver, platinum, and alloys of these elements. In addition, the bath may include particles, such as, for example, alumina particles, silicon carbide particle, silicon nitride particles, or glass particles, that will become disposed within an electrodeposited metal matrix. The electrodeposited compositionally modulated material, in some embodiments, fills at least 10% of the accessible interior void structure. In other embodiments, the compositionally modulated material fills at least: 20%, 30%, 40%, 50%, 60%, 70%, 80%, or 90%. In other embodiments, the compositionally modulated material fills substantially 100% of the accessible interior void structure. In certain embodiments, the compositionally modulated material has a thickness that continuously increases through a portion (e.g., through the depth) of the composite. In some embodiments, the methods can include a step of depositing a compositionally modulated layer on an exterior surface of the composite. The substrate material can be a consolidated material, such as, for example, a foam or a fabric. In other embodiments, the substrate material can be an unconsolidated material, such as, for example, a particle bed or a mass of fiber. The substrate material can be conductive or nonconductive. In certain embodiments, the substrate material can be a graded element, such as, for example, a particle bed having layers of different sized particles, or a foam having layers consisting of different porosities.

In another aspect, embodiments of the disclosure include a method for forming a component, such as, for example, a panel for a vehicle, a frame for a sporting good, or a body panel or plate for a suit of armor. The method includes stamping a porous preform having an accessible interior void structure into a predetermined shape to form an object and electrodepositing a nanolaminate coating to fill at least a portion of the accessible interior void structure of the object to form the component. The nanolaminate coating may be formed using any electrodeposition method, including those methods disclosed herein. In some embodiments, electrodepositing the nanolaminate coating includes applying a voltage or current with a time varying frequency to an electrode submerged in a fluid containing electrodepositable components. In certain embodiments, electrodepositing the nanolaminate coating includes modulating a flow rate of a fluid including electrodepositable components through the accessible interior voids structure at a time dependent frequency.

In general, the composite material and methods of forming the composite material described above can include one or more of the following advantages. In certain embodiments, composite materials herein described are light in weight but also structurally strong and sound, such that the composite materials can be used in ballistic applications (e.g., body armor panels or tank panels), in automotive, watercraft or aircraft protection applications (e.g., car door panels, racing shells and boat, plane and helicopter body parts) and in sporting equipment applications (e.g., golf club shafts and tennis racket frames). The composite materials may be used in combination with other types of ballistic or structural applications, known now or developed after this disclosure. Due to the open, accessible void structure of the porous substrate prior to deposition of the electrodeposited compositionally modulated material, the composite can include a greater amount per unit volume of material of the electrodeposited material than conventional composites, which include deposits solely along a two-dimensional flat surface. As a result, the composite material in accordance with the features described above can be tailored for applications where it is advantageous for the material properties of the electrodeposited compositionally modulated material to dominate or to provide a greater impact on the overall material properties of the composite material. The compositionally modulated material can be easily deposited using electrodeposition techniques. The electrodeposition techniques described in this application can be used to control and modulate the composition of the deposited material within the void structure. Moreover, the electrodeposition techniques are easily scalable to commercial manufacturing techniques and do not involve relatively expensive equipment, such as, for example, dc magnetron sputtering apparatus, or involve processing under extreme environments, such as toxic gases and vacuum atmospheric conditions. Thus, methods described herein can provide a relatively low cost, efficient means of producing a light-weight, structurally advanced composite material.

BRIEF DESCRIPTION OF THE DRAWINGS

In the drawings, like reference characters generally refer to the same parts throughout the different views. Also, the drawings are not necessarily to scale, emphasis instead being placed upon illustrating the principles of the disclosure.

FIG. 5A is a plot of applied frequency to a working electrode in an electrochemical cell versus time. FIG. 5B is a plot of applied amplitude to a working electrode in an electrochemical cell versus time. FIG. 5C is a plot of applied current density to a working electrode in an electrochemical cell versus time. FIG. 5D is an envisioned resulting deposit composition map corresponding to the applied current density given in FIG. 5C (i.e., one frequency modulation cycle of deposition). FIG. 5E is an envisioned composition map corresponding to application of ten frequency modulation cycles of deposition.

FIG. 7A is an illustration of a composite including an electrochemically infused particle bed having a particle distribution that gradually increases from the exterior surfaces of the composite into the center of the composite. FIGS. 7B and 7C are other illustrations of a composite including an electrochemically infused particle bed. In FIG. 7B, the particles have a repeating size distribution. In FIG. 7C the particles have a graded distribution.

FIG. 13A is a graph of the frequency and duty cycle modulation waveform for producing the applied current density waveform shown in FIG. 13B. FIG. 13C is a cross-sectional view of the compositionally modulating material that is produced under the applied current shown in FIG. 13B.

DETAILED DESCRIPTION

Figure 1A:
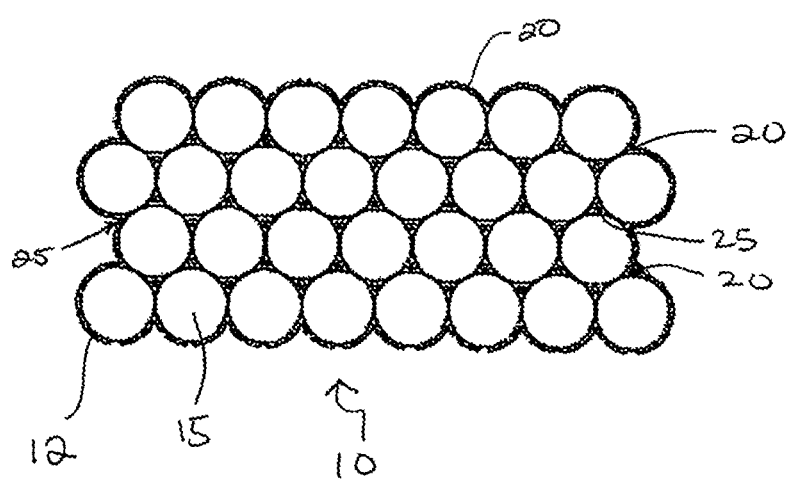
FIG. 1A is an illustration of a cross-sectional view of a composite material in accordance with one embodiment of the present disclosure. This composite material includes a bed of conductive particles electrochemically sintered together with a compositionally modulated electrodeposited material.

Referring now to the figures, FIG. 1A shows an exemplary composite material 10 including a porous substrate 12 that is electrochemically sintered or held together by a compositionally modulated electrodeposited material 20. The porous substrate 12 shown in FIG. 1A consists of a bed of conductive particles 15 that are hexagonally, closed packed to form a structure that has at least about 26% by volume of open accessible void space 25 due to the arrangement of the particles 15. When positioned within an electrochemical cell under deposition conditions, a compositionally modulated material 20 is deposited within the open void space 25 to electrochemically sinter the particles together to form the composite material 10. The compositionally modulated electrodeposited material 20, shown in an enlarged cross-sectional view in FIG. 1B, includes at least two constituents. The two or more constituents are electrodeposited in a manner such that an amount of the two or more constituents is varied to form different alloy layers within the material 20. The term "compositionally modulated" describes a material in which the chemical composition varies throughout at least one spatial coordinate, such as, for example, the material's depth. For example, in an electrochemical bath including a nickel-containing solution and an iron-containing solution, the resulting compositionally modulated electrodeposited material 20 includes alloys having a chemical make-up according to $Ni_xFe_{1-x}$, where x is a function of applied current or voltage and mass flow of the bath solution. Thus, by controlling or modulating at least one of the mass flow of the bath solution or the applied current or voltage to electrodes, the chemical make-up of a deposited layer can be controlled and varied through its depth (i.e., growth direction). As a result, the compositionally modulated electrodeposited material 20 shown in FIG. 1B includes several different alloys as illustrated by layers 30, 32, 34, 36, and 38.

Figure 1B:
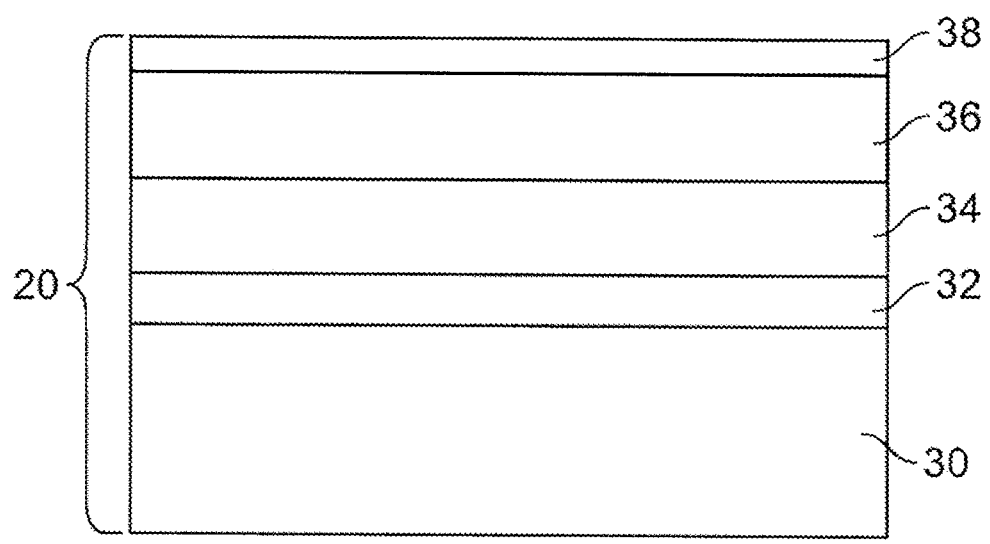
FIG. 1B is an illustration of an enlarged cross-sectional view of the compositionally modulated electrodeposited material of FIG. 1A.

Referring to FIG. 1B, layers 32 and 36 represent nickel-rich (x>0.5) deposits, whereas layers 30, 34, and 38 represent iron-rich (x<0.5) deposits. While layers 32 and 36 are both nickel rich deposits, the value for x in each of layers 32 and 36 need not be the same. For example, the x value in layer 32 may be 0.7 whereas the x value in layer 36 may be 0.6. Likewise, the x values in layers 30, 34, and 38 can also vary or remain constant. In addition to the composition of the constituents (e.g., Ni and Fe) varying through the depth of the electrodeposited material 20, a thickness of each of the layers 30 to 38 varies through the depth as well. FIG. 1B, while not to scale, illustrates the change or modulation in thickness through the layers 30, 32, 34, 36, and 38.

Figure 2:
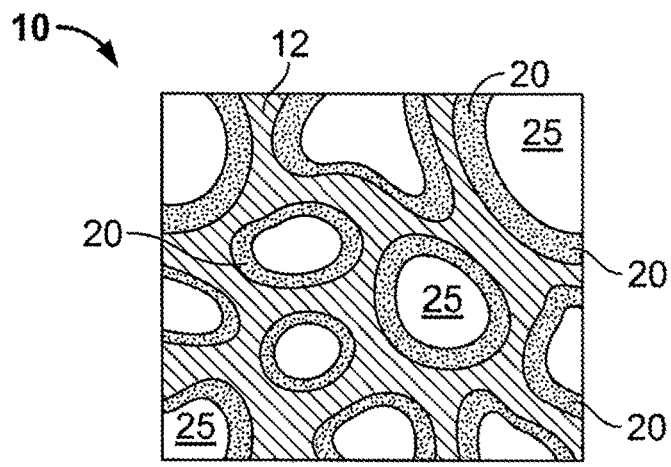
FIG. 2 is another illustration of a cross-sectional view of a composite material in accordance with another embodiment of the present disclosure. This composite material includes a consolidated porous substrate with a compositionally modulated electrodeposited material filling at least a portion of an open, accessible void structure of the porous substrate.

FIG. 2 illustrates another embodiment of the composite material 10. In this embodiment, the porous substrate 12 is a consolidated porous body. That is, the porous substrate 12 in this embodiment is a unitary piece that includes a plurality of voids 25 that define an accessible, interior void structure.

Examples of consolidated porous bodies include, foams, fabrics, meshes, and partially sintered compacts. The compositionally modulated material 20 is electrodeposited throughout the accessible, interior void structure to form a coating along the walls of the substrate 12 defining the voids 25.

Figure 3:
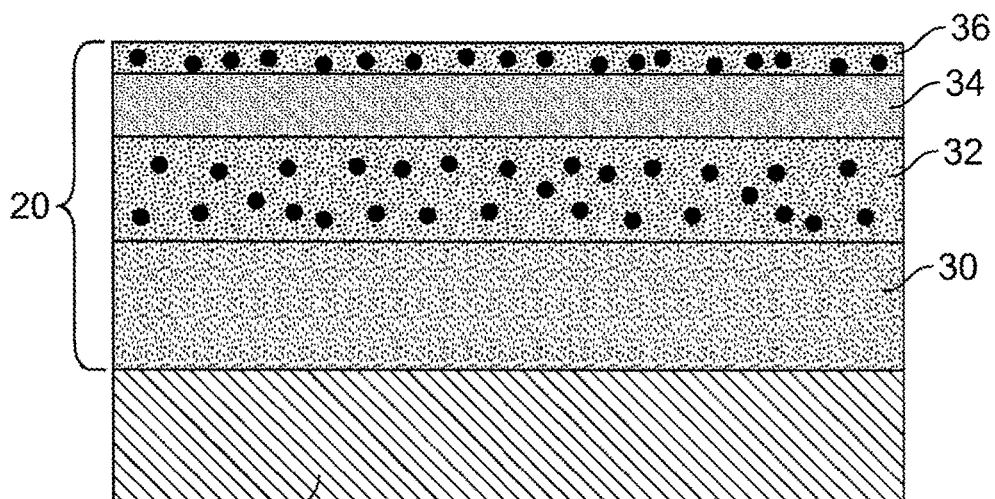
FIG. 3 is an illustration of a cross-sectional view of the compositionally modulated electrodeposited material of FIG. 2 along one of the voids.

Referring to FIG. 3, the compositionally modulated material 20 disposed within the plurality of voids 25 (as shown in FIG. 2) includes multiple alloys illustrated as distinct layers 30, 32, 34, and 36. As described above the compositionally modulated material 20 is varied in both constituent concentration (i.e., to form the different alloy layers making up the material 20) and in thickness of the layers. In the embodiment shown in FIG. 3, the nickel-rich layers 32 and 36 further include a concentration of particles disposed therein, thereby forming particle-reinforced composite layers. As shown in FIG. 3, layers 32 and 36 need not include the same-concentration of particles, thereby allowing the compositionally modulated material 20 to be further tailored to provide optimal material properties. While not wishing to be bound by any particular theory, it is believed that increasing the concentration of the particles in a layer increases the hardness of that particular layer. The concentration of particles per layer can be controlled through modulating the flow rate of the bath during electrodeposition. The particles can have any shape, such as spherical particles, pyramidal particles, rectangular particles, or irregularly shaped particles. In addition, the particles can be of any length scale, such as for example, millimeter sized (e.g., 1 to 5 millimeter), micron-sized (e.g., 100 microns to 0.1 microns), nanometer sized (e.g., 100 nm to 1 nm). In some embodiments, 85% or more (e.g., 87%, 89%, 90%, 93%, 95%, 96%, 97%, 98%, 99%, 100%) of the nanosized particles have an average grain size within a range of 10 nm to 100 nm. In certain embodiments, 85% or more of the nanosized particles have an average grain size within a range of 20 nm to 50 nm, 30 nm to 50 nm, 10 nm to 30 nm, or 1 to 10 nm. Examples of some suitable particles include carbide particles, alumina particles, glass particles, polymer particles, silicon carbide fibers, and clay platelets.

Figure 4:
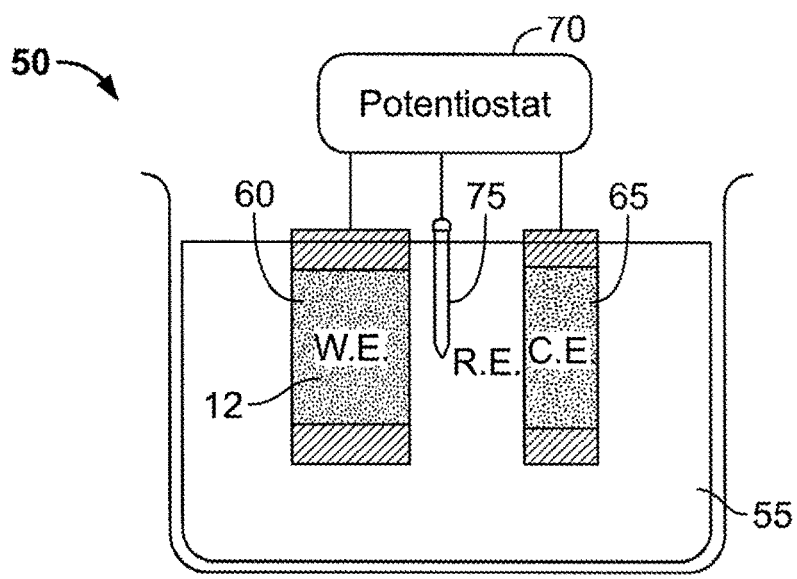
FIG. 4 is an illustration of an electroplating cell including a working electrode attached to a porous substrate.

To form or deposit the compositionally modulated electrodeposited material 20, the porous substrate 12 is submerged into an electrochemical cell. Referring to FIG. 4, an electrodeposition cell 50, in one embodiment, includes a bath 55 of two or more of metal salts, a cathode (i.e., working electrode) 60, an anode (i.e., a counter electrode) 65, and a potentiostat 70, which electrically connects and controls the applied current between the working and counter electrodes, 60 and 65, respectively. The cell 50 can also include a reference electrode 75 to aid the potentiostat 70 in accurately controlling the applied current by providing a reference base line current measurement. In general, when an electrical current is passed through the cell 50, an oxidation/reduction reaction involving the metal ions in the bath 55 occurs and the resulting product is deposited on the working electrode 60. As shown in FIG. 4, the porous substrate 12 is positioned in contact with the working electrode 60. For example, in certain embodiments, the porous substrate is formed of a conductive material and functions as an extension of the working electrode 60. As a result, the resulting product of the oxidation/reduction reaction deposits within the accessible interior void structure 25. In other embodiments, the porous substrate 12 is formed of a nonconductive material and thus, electrodeposition occurs at a junction between the working electrode 60 and the porous substrate 12.

In general, one of the advantages of the methods and resulting composite materials described in this disclosure is a wide range of choices of materials available for deposition into the interior void structure 25 of the porous substrate 12. For example, salts of any transition metal can be used to form the bath 55. Specifically, some preferred materials include salts of the following metals: nickel, iron, copper, cobalt, gold, silver, and platinum. In addition to the wide range of materials available, electrodeposition techniques have an additional advantage of easily modifiable processing conditions. For example, a ratio of the metal salts and other electrodepositable components, such as, for example, alumina particles, can be controlled by their concentration within the bath. Thus, it is possible to provide a bath that has a Ni:Fe ratio of 1:1, 2:1, 3:1, 5:1, 10:1 or 20:1 by increasing or decreasing the concentration of a Fe salt within the bath in comparison to the Ni salt prior to deposition. Such ratios can thus be achieved for any of the electrodepositable components. Where more than two electrodepositable components are provided, such ratios can be achieved as between any two of the components such that the overall ratios for all components will be that which is desired. For example, a bath with Ni, Fe and Cu salts could yield ratios of Ni:Fe of 1:2 and a Ni:Cu of 1:3, making the overall ratio of Ni:Fe:Cu 1:2:3. In addition, a bath with Ni salt and alumina particles could yield a ratio of Ni:Al$_2$O$_3$ of 2:1, 2:1, 1:2, 3:1 or 1:3 by increasing or decreasing the concentration of particles within the bath.

Figure 5A:
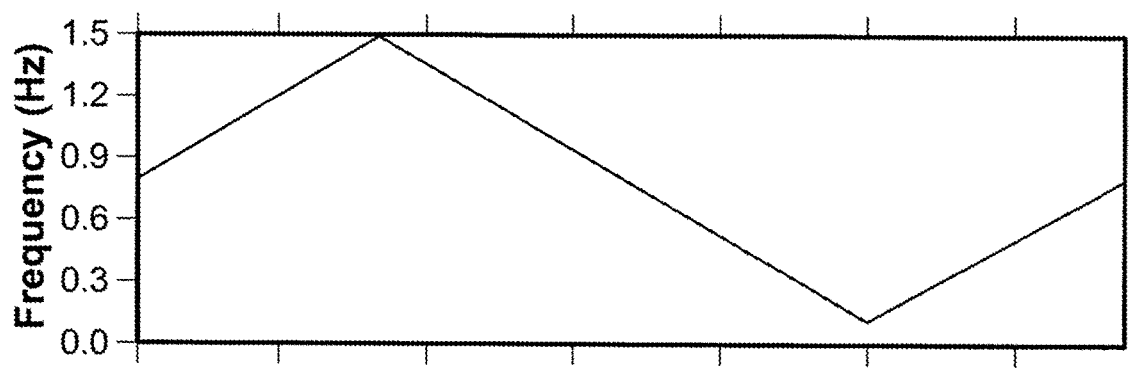
FIGS. 5A, 5B, 5C, 5D, and 5E are graphs showing electrodeposition conditions and resulting composition maps for the deposition conditions.
Figure 5B:
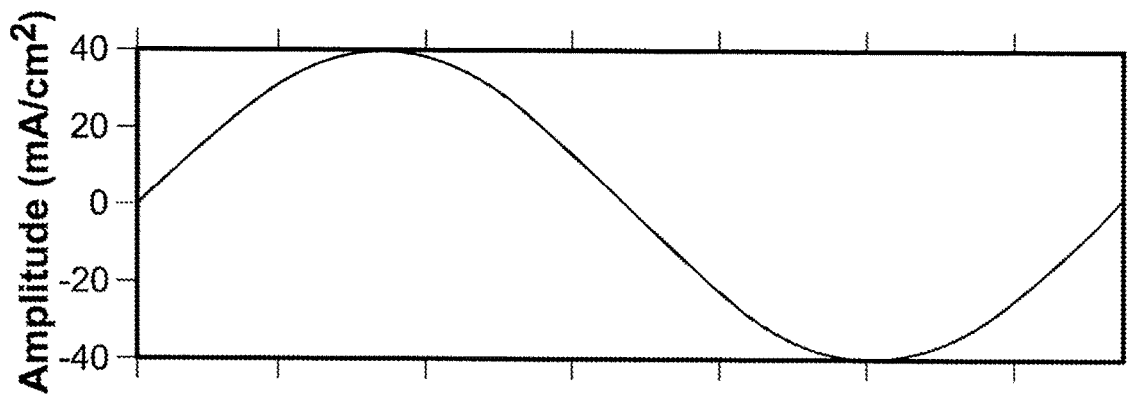
Figure 5C:
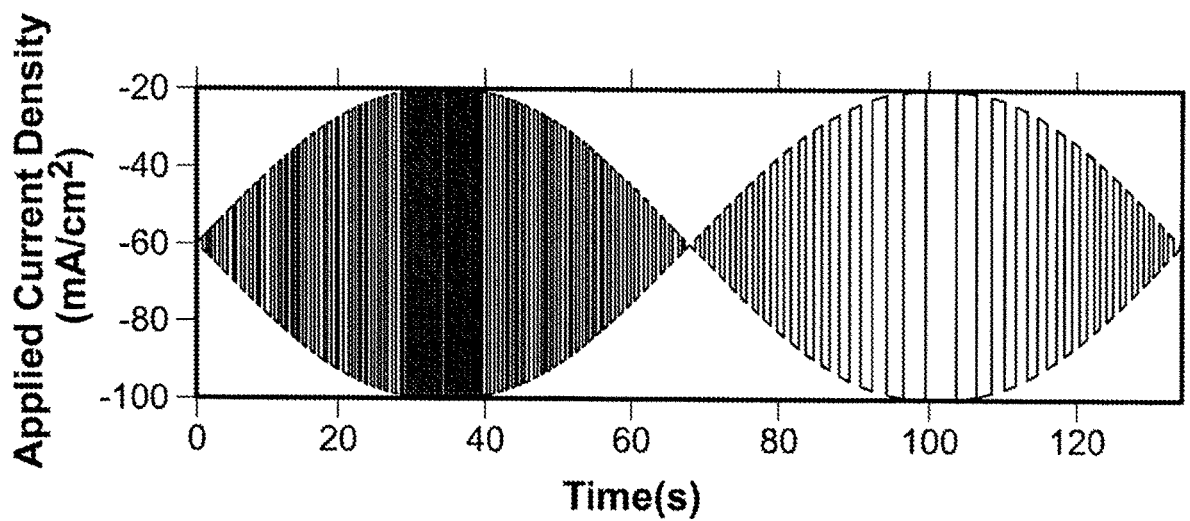
Figure 5D:
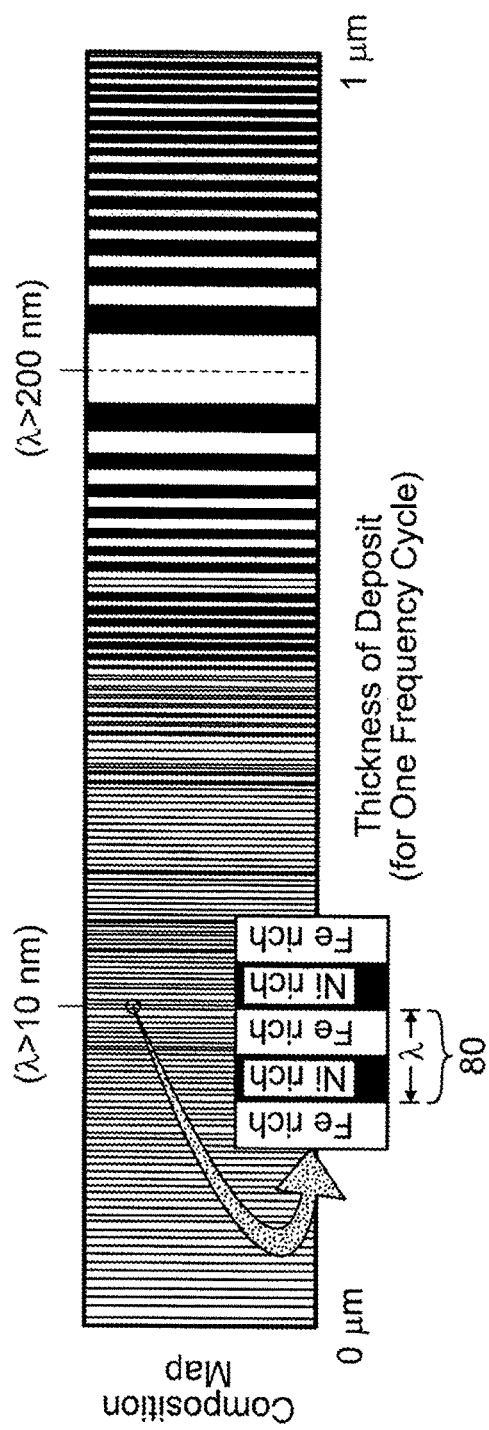

FIGS. 5A, 5B, and 5C illustrate applied conditions to the electrochemical cell 50 for depositing the compositionally modulated material 20. FIG. 5D illustrates a resulting composition map for the applied conditions shown in FIGS. 5A, 5B, and 5C. FIG. 5C shows the current density over a period of 130 seconds applied to the working electrode 60. The applied current drives the oxidation/reduction reaction at the electrode to deposit a material product having the form $A_xB_{1-x}$, where A is a first bath constituent and B is a second bath constituent.

Another way of defining the modulation of the compositions of the deposited alloys ($A_xB_{1-x}$, where x varies) is with respect to a composition cycle. A composition cycle 80 defines the deposition of a pair of layers. The first layer of the composition cycles is a A-rich and the second layer is B-rich. Each composition cycle has a wavelength. A value assigned to the wavelength is equal to the thickness of the two layers forming the composition cycle 80. That is, the wavelength has a value that is equal to two times the thickness of one of the two layers forming the composition cycle (e.g., $\lambda$=10 nm, when thickness of Ni-rich layer within the composition cycle is equal to 5 nm). By including one or more composition cycles the deposited material is compositionally modulating. In a preferred embodiment, the compositionally modulated electrodeposited material 20 includes multiple composition cycles 20 (e.g., 5 composition cycles, 10 composition cycles, 20 composition cycles, 50 composition cycles, 100 composition cycles, 1,000 composition cycles, 10,000 composition cycles, 100,000 composition cycles or more).

Figure 6A:
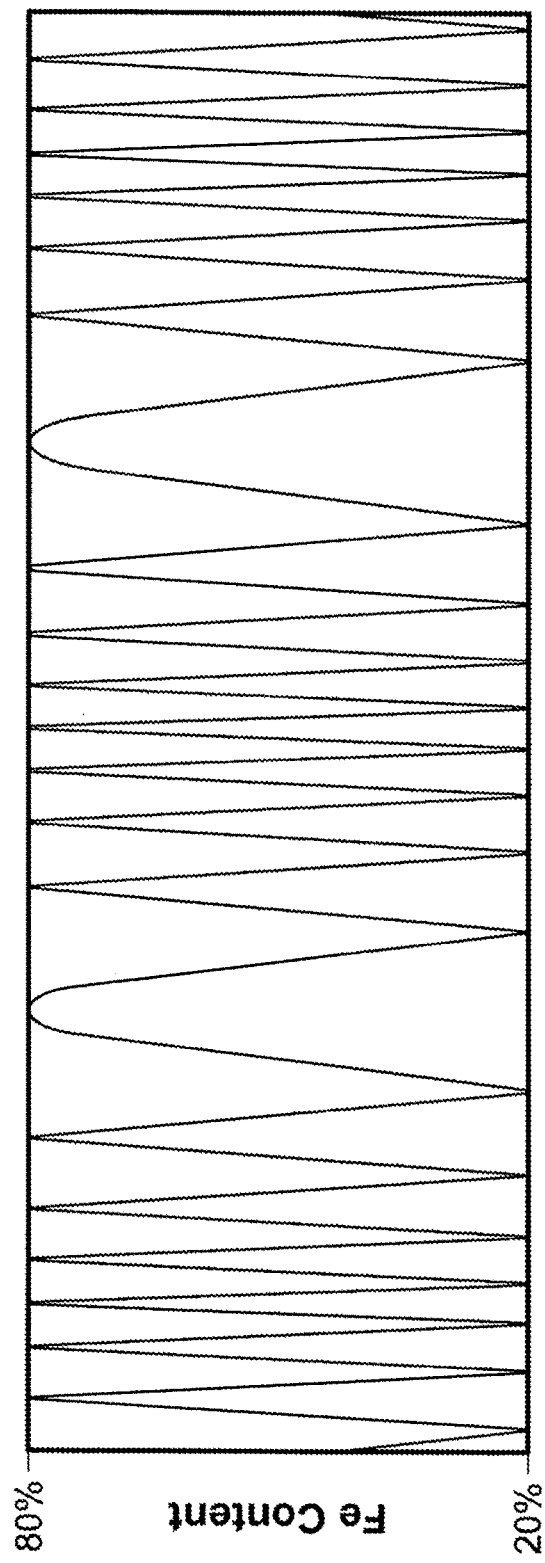
FIG. 6A is a graph showing a waveform of iron content in a nickel-iron compositionally modulated electrodeposited coating and FIG. 6B is the corresponding composition map.
Figure 6B:
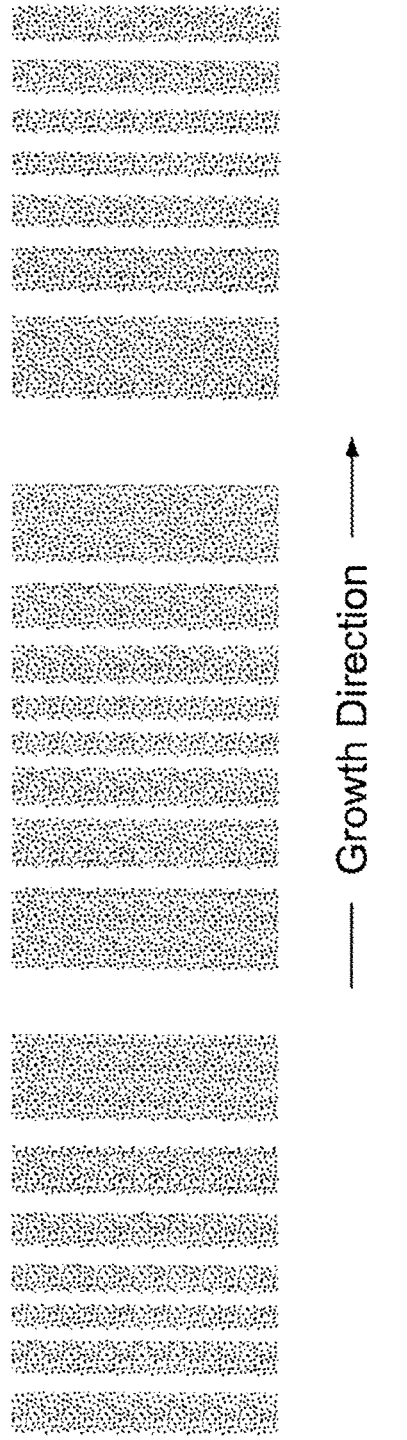

The applied current density as shown in FIG. 5C is determined from an applied variation in frequency of the current per time (FIG. 5A) in combination with an applied variation in amplitude of the current per time (FIG. 5B). Referring to FIG. 5A, an applied frequency modulation, shown here as a triangle wave, effects the wavelength of the composition cycles. As shown by comparing FIGS. 5A and 5D, the wavelength of the composition cycles decreases as the frequency increases. While FIG. 5A illustrates this effect with an applied triangle wave, any waveform (i.e., a value that changes with time) may be applied to control or modulate the frequency and thus control or modulate the thickness/wavelengths of the deposited material 20. Examples of other waveforms that may be applied to tailor the changing thickness/wavelength of each of the deposited layers/composition cycles include sine waves, square waves, sawtooth waves, and any combination of these waveforms. The composition of the deposit (i.e., x value) can also be further modulated by varying the amplitude. FIG. 5B illustrates a sine wave modulation of the applied amplitude of the current applied to the working electrode. By changing the amplitude over time, the value of x varies over time such that not all of the Ni-rich layers have the same composition (nor do all the Fe-rich layers have the same composition). Referring to FIGS. 6A and 6B, in some embodiments, the value of x is modulated within each of the layers, such that the compositionally modulated electrodeposited material 20 is graded to minimize or mask composition discontinuities. As a result of applying one or more of the above deposition conditions, the compositionally modulated electrodeposited material 20 can be tailored to include layers that provide a wide range of material properties and enhancements.

One such enhancement is an increase in hardness. Without wishing to be bound to any particular theory, it is believed that regions of nanolaminate material (i.e., regions in which all of the composition cycles have a wavelength less than about 200 nm and preferably less than about 80 nm) exhibit a superior hardness not achievable by the same materials at greater lengths scales. This superior hardness is believed to arise from an increase in the material's elastic modulus coefficient, and is known as the "supermodulus effect." In certain embodiments, the compositionally modulated electrodeposited material 20 is deposited to include one or more regions, which provide the composite material 10 with the supermodulus effect. That is, the compositionally modulated electrodeposited material 20 disposed within the void structure 25 of the porous substrate 12 includes one or more regions in which all of the composition cycles include wavelengths less than 200 nm, and preferably less than about 80 nm. In one embodiment, the wavelengths are less than about 70 nm. In another embodiment, the hardness of the composite material 10 is enhanced by including varying concentrations of particles (e.g., $Al_2O_3$, SiC, $Si_3N_4$) within an electrodeposited metal. For example, by increasing the concentration of $Al_2O_3$ particles dispersed within layers of an electrodeposited Ni metal, an increase in Vicker's Hardness from 240 VHN to 440 VHN is achievable.

In some embodiments, the compositionally modulated electrodeposited material 20 can include regions in which the composition cycles 80 include wavelengths less than 200 nm (and thus which may exhibit the supermodulus effect) and also include regions in which some portion (e.g., at least or about: 1%, 2%, 5%, 7%, 10%, 20%, 30%, 40%, 50%, 60%, 70%, 80%, 90%, 92% 95%, 97%, 99% and 100%) of the composition cycles 80 include wavelengths greater than 200 nm. The portion(s) of the composition cycles 80 that include wavelengths greater than 200 nm could also be represented in ranges. For example, the composition cycles 80 of one or more regions could include a number of wavelengths greater than 200 nm in a range of from 1-2%, 2-5%, 1-5%, 5-7%, 5-10%, 1-10%, 10-20%, 20-30%, 30-40%, 40-50%, 50-60%, 60-70%, 70-80%, 80-90%, 90-92%, 90-95%, 95-97%, 95-99%, 95-100%, 90-100%, 80-100%, etc., with the balance of the composition cycles being less than 200 nm in that region. Without wishing to be bound by any particular theory, it is believed that, as hardness increases, ductility decreases. As a result, in order to provide a composite material that is enhanced to include regions of increased hardness and regions of increased ductility, the compositionally modulated electrodeposited material 20, in some embodiments, can include one or more regions in which all of the composition cycles 80 have a wavelength of about 200 nm or less, one or more regions in which all of the composition cycles have a wavelength greater than 200 nm, and/or one or more regions in which a portion of the composition cycles 80 have a wavelength of about 200 nm or less and a portion have a wavelength greater than 200 nm. Within each of those portions, the wavelengths also can be adjusted to be of a desired size or range of sizes. Thus, for example, the region(s) having composition cycles of a wavelength of about 200 nm or less can themselves have wavelengths that vary from region to region or even within a region. Thus, is some embodiments, one region may have composition cycles having a wavelength of from 80-150 nm and another region in which the wavelengths are less than 80 nm. In other embodiments, one region could have both composition cycles of from 80-150 nm and less than 80 nm.

In certain embodiments, the compositionally modulated material 20 is tailored to minimize (e.g., prevent) delamination of its layers during use. For example, it is believed that when a projectile impacts a conventional laminated material, the resulting stress waves may cause delamination or debonding due to the presence of discontinuities. However, the compositionally modulated electrodeposited material 20 described herein can include a substantially continuous modulation of both its composition (i.e., x value) and wavelength such that discontinuities are minimized or eliminated, thereby preventing delamination.

Figure 7A:
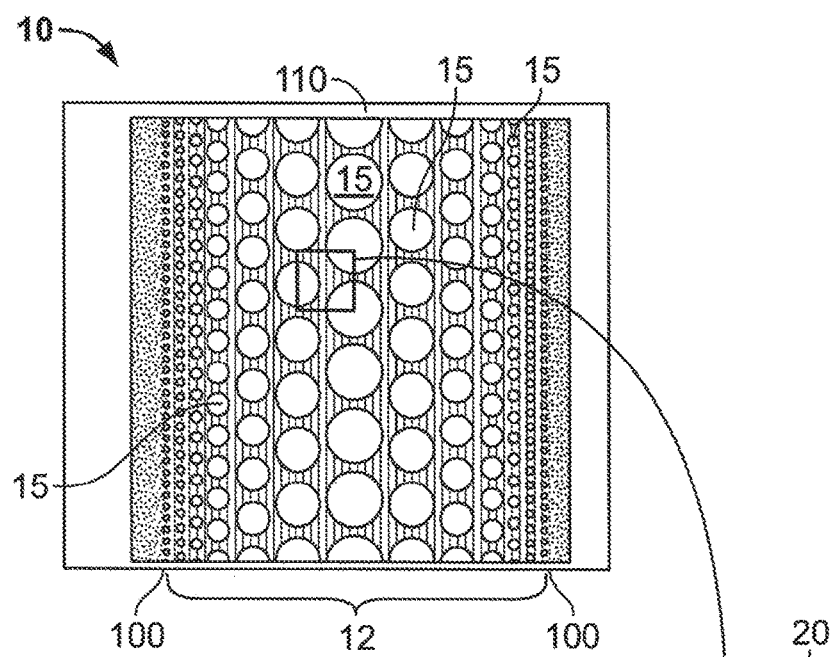
FIGS. 7A-7C are illustrations of cross-sectional views of various embodiments of composite materials in accordance with the present disclosure.
Figure 7B:
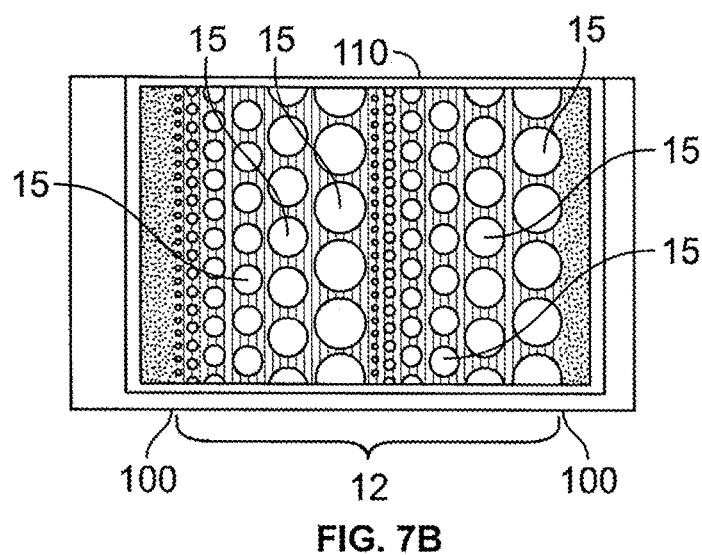
Figure 7C:
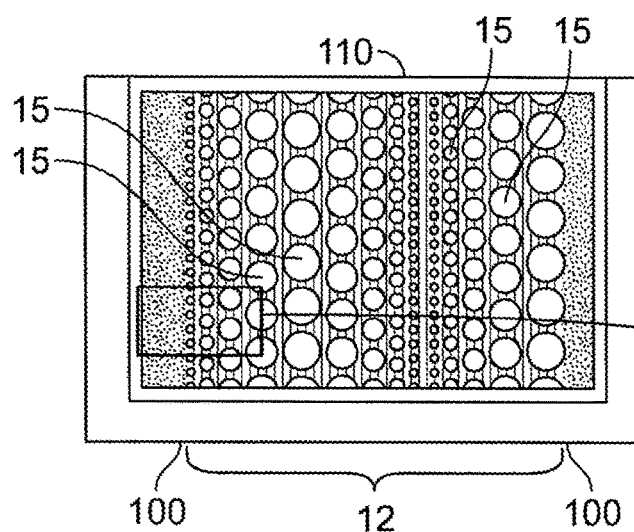

Referring to FIGS. 7A-7C, in addition to compositionally modulating the electrodeposited material 20 to form the composite 10, the porous substrate material 12 can also be made of a material that is modulated through its depth. For example, as shown in FIG. 7A, in one embodiment, the porous substrate 12 is formed of particles 15 that gradually increase in size from an exterior 100 of the compact to an interior 110 of the composite 10. The particles in such embodiments can range from, e.g., 5 nm on the exterior 100 to 50 microns in the interior 110, 5 nm on the exterior 100 to 10 microns in the interior 110, 5 nm on the exterior to 1 micron in the interior 110, 10 nm on the exterior 100 to 10 microns in the interior 110, or from 10 nm on the exterior 100 to 1 micron in the interior. The differently sized particles 15 contribute to the material properties of the composite 10. For example, smaller particles have a greater surface area energy per unit volume than larger particles of the same material. As a result, the porous substrate can be tailored to provide additional advantageous material properties to different regions of the composite 10. Referring to FIGS. 7B and 7C, the porous substrate 12 can have other particle arrangements to provide different material properties to the composite 10. For example, in FIG. 7B the particles have a repetitive size distribution and in FIG. 7C the particles have a graded distribution.

Figure 8A:
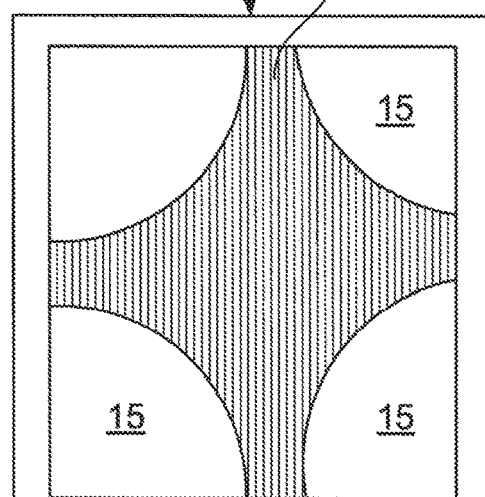
FIGS. 8A and 8B are illustrations of two separate embodiments of a compositionally modulated material disposed within the void structure between four particles.
Figure 8B:
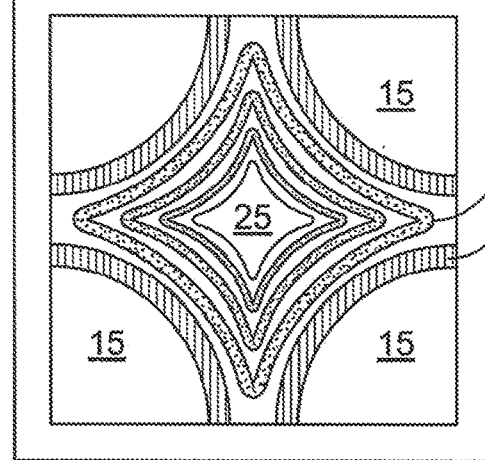

FIGS. 8A and 8B show an enlarged cross-sectional view of the compositionally modulated electrodeposited material 20 disposed between four adjacent particles 15 of a porous substrate 12. In FIG. 8A, the particles 15 forming the porous substrate 12 are non-conductive particles (e.g., alumina particles, glass particles). As a result of their non-conductivity, electrodeposition occurs between two electrodes disposed on either end of the porous substrate 12 and the compositionally modulated electrodeposited material 20 is deposited in a bottom-up fashion. Thus, the compositionally modulated electrodeposited material fills the entire void structure 25 between the four particles. In the embodiment shown in FIG. 8B, the particles 15 are electrically conductive. As a result, electrodeposition can occur within the conductive porous material to produce layers that are initiated at a particle/void interface 120 and grow inwards to fill at least a portion of the interior void structure 25.

Figure 9:
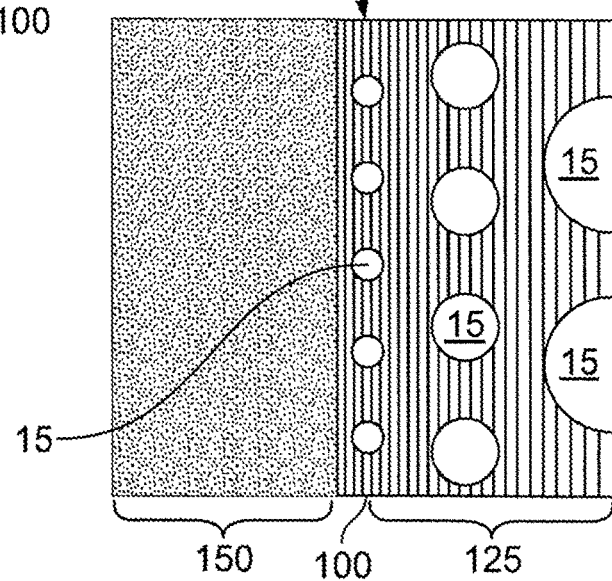
FIG. 9 is an illustration of a cross-sectional view of an embodiment of a composite material including a nanostructured capping layer deposited on an exterior surface of a porous substrate.

In addition to electrodepositing into a porous preform, the compositionally modulated material 20 can also be deposited on the exterior surfaces 100 of the porous substrate 12. For example, after the accessible interior void structure 25 is at least partially filled in the case of an electrically conductive porous substrate or substantially filled in the case of a non-conductive porous substrate, an additional or capping layer 150 can be deposited onto the substrate to seal off the interior porous structure 25 as shown in FIG. 9.

Figure 10:
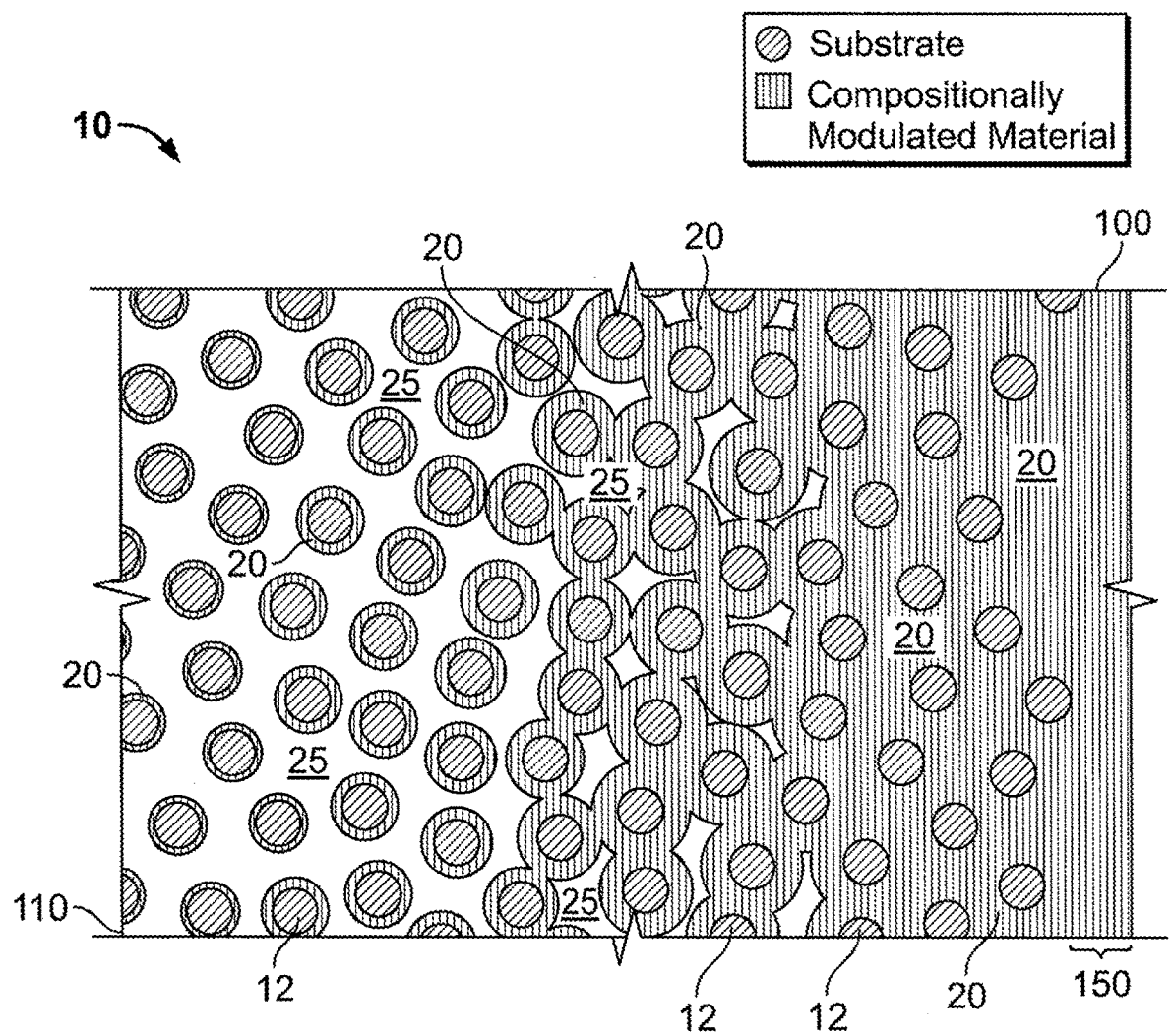
FIG. 10 is an illustration of a cross-sectional view of an embodiment of a consolidated, conductive porous substrate with a tailored filling of a compositionally modulated electrodeposit coating disposed within its accessible void structure. Deposition conditions for this embodiment have been tailored to not only vary a thickness of the coating throughout the depth of the consolidated conductive porous substrate, but also to cap or seal the composite with a dense compositionally modulated layer that closes off accessibility to the interior void structure.

In certain embodiments, the filling of the accessible interior void structure 25 is tailored such that the thickness of the compositionally modulating electrodeposited material 20 varies throughout the composite 10. For example, FIG. 10 illustrates a composite material 10 formed of a porous conductive foam 12 and a $Ni_xFe_{1-x}$ compositionally modulated material 20. The thickness of the compositionally modulated material 20 continuously increases (i.e., thickens) from the interior portion 110 of the porous substrate 12 to the exterior 100. To create this thickening, the current density during deposition is continuously increased. In addition to including the compositionally modulated material 20 disposed throughout the void structure 25 of the substrate 12, a dense layer of the compositionally modulated material, referred to as the capping layer 150 is further applied to the exterior 100 of the substrate 12 to close off the accessible pore structure 25.

Methods of forming the composite 10 using electrodeposition can include the following steps: (1) forming a bath including at least two electrodepositable components, (2) connecting the porous preform 12 to the working electrode 60, (3) inserting the porous preform 12, the working electrode 60, and the counter electrode 65 into the bath 55, and (4) applying a voltage or current to the working electrode 60 to drive electrodeposition.

Figure 5E:
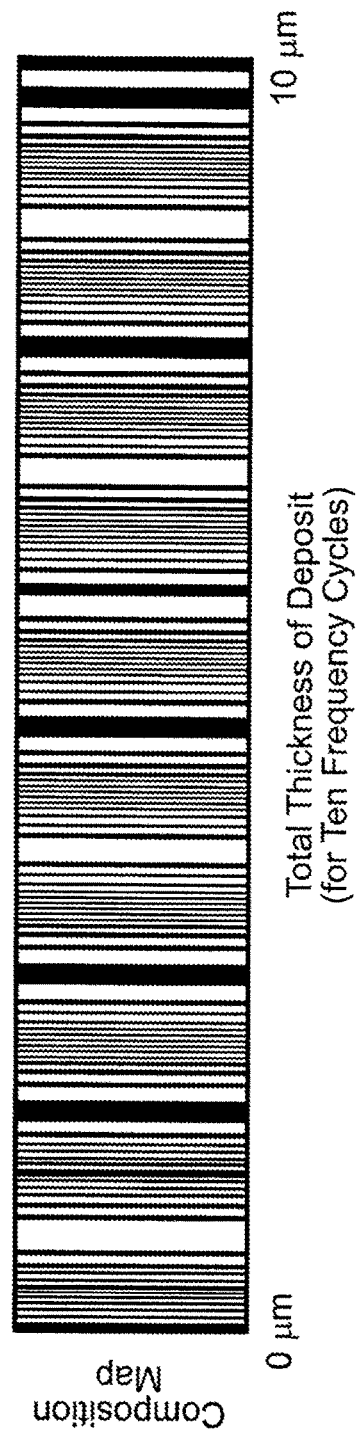

In general, in one embodiment, the voltage or current applied to the working electrode 60 varies over time so that the compositionally modulated material is electrodeposited into the voids 25 of the porous substrate 12. Thus, in some embodiments, the voltage or current is applied to the electrode 60 with a time varying frequency that oscillates in accordance with a triangle wave. In other embodiments, the voltage or current is applied to the electrode with a time varying frequency that oscillates in accordance with a sine wave, a square wave, a saw-tooth wave, or any other waveform, such as a combination of the foregoing waveforms. The voltage or current can be applied for one waveform cycle as shown in FIG. 5A, or preferably for two or more cycles (e.g., three cycles, five cycles, 10 cycles, 20 cycles). FIG. 5E shows the envisioned composition map for a 10 cycle deposit.

In addition to controlling the voltage or current, other deposition conditions can also be monitored and varied to tailor the compositionally modulating material 20. For example, it is believed that the pH of the bath has an effect on upon the quality of the deposited material. Thus, in some embodiments, the pH of the bath is controlled during electrodeposition. For example, prior to deposition a pH set point (e.g., a pH of 1, 2, 3, 4, 5, 6, 7, 8, 9, 10, 11, 12, 13 or 14) or range (e.g., a pH of 1-2, 2-3, 3-4, 5-6, 6-7, 7-8, 8-9, 9-10, 10-11, 11-12, 12-13, or 13-14) is determined. During electrodeposition, the pH of the bath is monitored and if a difference from the set point is determined, pH altering chemicals, such as, for example, HCl or NaOH, are added to the bath to return the bath to its pH set point.

The concentration of the electrodepositable components in the bath can also be monitored and controlled. For example, concentration sensors can be positioned within the cell 50 to monitor the concentrations of the metal salts as well as any depositable particles within the bath. During electrodeposition of the compositionally modulated material 20, the concentrations of the depositable components (e.g., metal salts, particles) can become depleted or at least decreased from a predetermined optimal level within the bath. As a result, the timeliness of the deposition of the compositionally modulated material 20 can be effected. Thus, by monitoring and replenishing the concentrations of the depositable components electrodeposition can be optimized.

In certain embodiments, flow rate of the bath can be modulated or varied. As described above, both the applied current or voltage and the mass flow rate of the depositable components effects the x-value of the electrodeposit (e.g., $Ni_xFe_{1-x}$). Thus, in some embodiments, the flow rate of the bath containing the depositable components is varied in addition to the applied voltage or current to produce the modulation in the value of x. In other embodiments, the applied voltage or current remains constant and the flow rate is varied to produce the modulation in the value of x. The flow rate of the bath can be increased or decreased by providing agitation, such as, for example, a magnetically-controlled mixer or by adding a pump to the cell 50.

Figure 11:
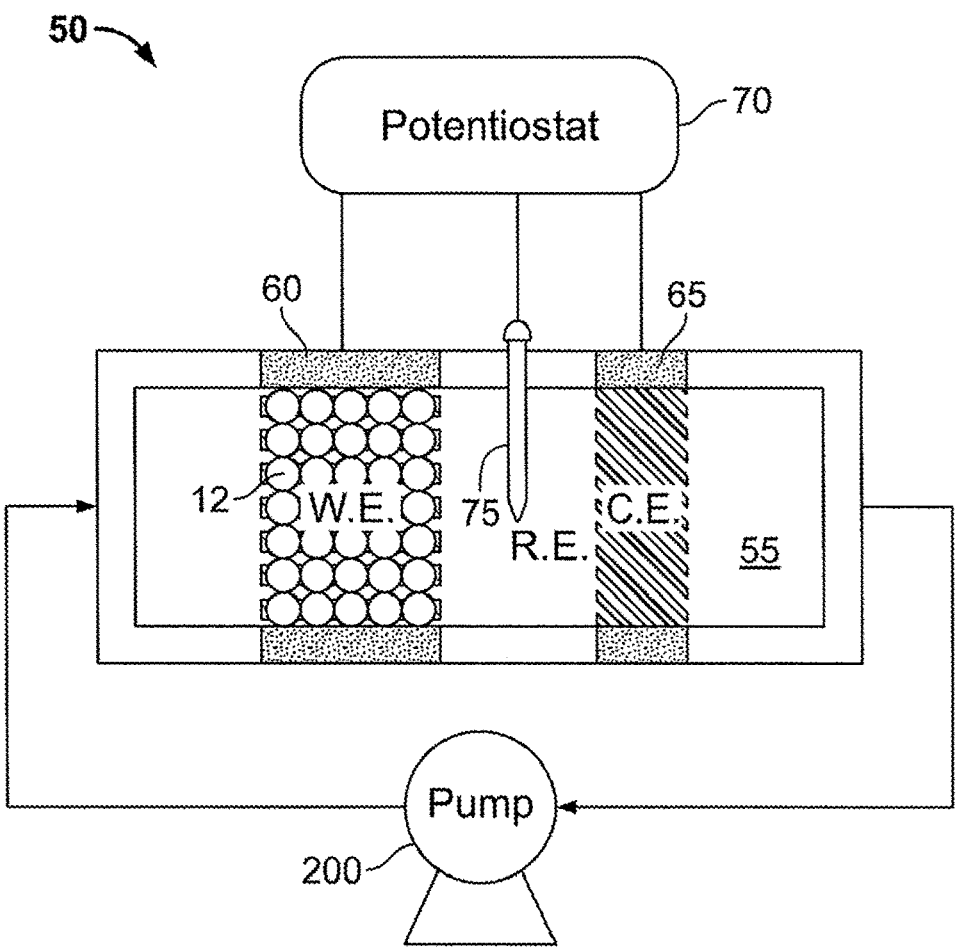
FIG. 11 is an illustration of a flow cell for electrodepositing a compositionally modulated material into a void structure of an electrically conductive porous substrate.
Figure 12:
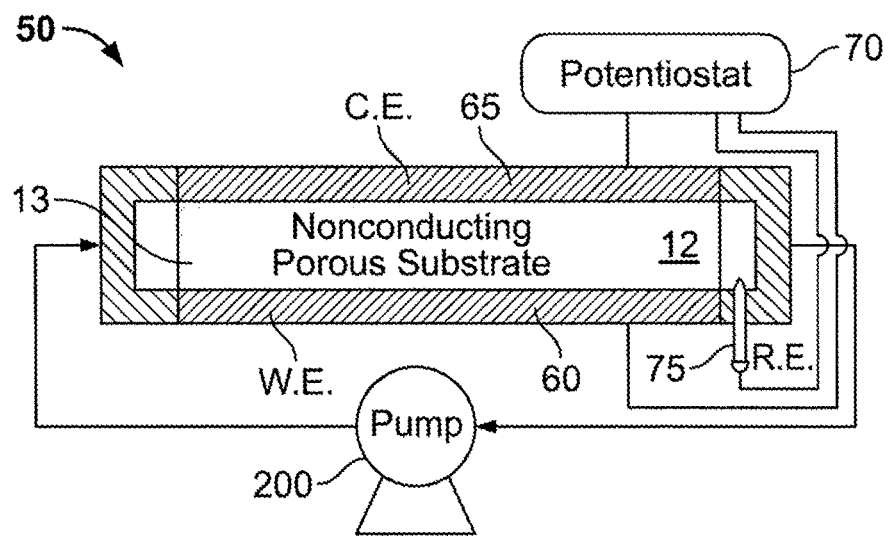
FIG. 12 is an illustration of a flow cell for electrodepositing a compositionally modulated material into a void structure of an electrically non-conductive porous substrate.

FIGS. 11 and 12 illustrate embodiments of an electrochemical cell 50 that includes a pump 200. In general, these cells 50 are referred to as flow cells because they force a bath solution through a porous substrate. Referring to FIG. 11, the flow cell includes a porous working electrode 60, which is also the porous electrically-conductive substrate 12, and a porous counter electrode 65. The working electrode 60, the counter electrode 65 and the reference electrode 75 are in communication and are controlled by the potentiostat 70. The bath fluid 55 including the depositable components is forced through the porous working electrode 60 (and thus the porous substrate 12) and the counter electrode 65 at a flow rate adjustable at the pump 200. Thus, in certain embodiments, the flow rate of the pump 200 can be controlled in accordance with a triangle wave, square wave, sine wave, a saw tooth wave, or any other waveform, such that the flow rate can be modulated to produce the compositionally modulated material 20.

FIG. 12 illustrates another embodiment of a flow cell 50 for use with non-conductive porous substrates 12. In this cell 50, the working electrode 60 and the counter electrode 65 are disposed within a wall of the cell 50 and the bath fluid 55 is forced through the porous non-conductive substrate 12. Electrodeposition occurs in a bottom-up fashion, that is the deposition of material 20 proceeds from the working electrode 60 to the counter electrode 65 substantially filling the void structure 25 along the way.

The methods and composite materials described herein can be tailored to provide the unusual combination of strength, ductility, and low-density. For example, the porous substrate 12 forming the matrix of the composite material 10 can be formed of a light-weigh ceramic material or can include a relatively large amount (e.g., 40% by volume, 50% by volume, 60% by volume) of accessible interior void space 25. The compositionally modulated material 20 electrodeposited into the accessible, interior void space 25 can be tailored to provide strength at least in part through nanolaminate regions and ductility at least in part through micron or submicron sized laminated regions. These composite materials can be utilized in automotive applications, ballistic applications, sporting good applications, or any other application that would benefit from this combination of material properties.

EXAMPLES

The following examples are provided to further illustrate and to facilitate the understanding of the disclosure. These specific examples are intended to be illustrative of the disclosure and are not intended to be limiting.

Example 1

A composite including a Ni foam porous substrate and an electrodeposited compositionally modulated NiFe alloy was formed in a laboratory using the following procedure. A bath was prepared using 0.2M $Ni(H_2NSO_3)_2.4H_2O$, $0.04FeCl_2.4H_2O$, 0.40M $H_3BO_3$, 1.5 g/L sodium saccharin, 0.2 g/L sodium dodecyl sulfate, 1.0 g/L ascorbic acid, and HCl to attain a pH of 3.00±0.01. A 5 cm long, 1 cm wide, and 0.16 cm thick piece of Ni foam (commonly referred to a Incofoam) having a pore size of 450 microns was wrapped in vinyl electrical tape about the width and thickness of the foam such that 4 cm of length remained uncovered on one end and 0.5 cm of length remained uncovered on the other end. The vinyl covered portions of the foam were compressed by hand. The 4 cm of exposed Ni foam was dipped into a solution including 0.1 M HCl to condition the substrate.

Electrical connection between the Ni foam and a working electrode terminal of a potentiostat, (available from Gamry Instruments, Warminster, Pa., part number PCI/300) was made using an alligator clip connected to the 0.5 cm-long exposed end of the nickel foam. To complete electrical connections between the electrodes and the potentiostat, a 0.5 cm by 2 cm by 3 cm piece of 40 ppi reticulated vitreous carbon was connected to the counter electrode end of the potentiostat using an alligator clip and a saturated calomel electrode (i.e., a SCE) was connected to the reference electrode terminal.

After confirming electrical communication between the potentiostat and the working electrode, counter electrode, and reference electrode, the Ni foam, the reticulated vitreous carbon, and the SCE were immersed into the bath. Care was taken to ensure that the vinyl wrap about the Ni foam was positioned in the bath-air interface.

Once positioned within the bath, a time-varying current was applied to the working electrode. The time-varying current was designed to have the following waveform characteristics: (1) the current density varied in accordance with a square-wave having a maximum deposition current of −100 $mA/cm^2$ and a minimum deposition current of −10 $mA/cm^2$; (2) a duty cycle of 0.17 with the "off" part of the cycle corresponding to a current density setting of −10 $mA/cm^2$; and (3) a frequency modulation according to a triangle waveform having a peak of 5.5 Hz, a minimum of 0.02 Hz, and a modulation rate of 0.01 Hz. The time-varying current was applied to the working electrode until a total of 10 frequency cycles had passed (i.e., 1,000 seconds of time, 10 microns of growth).

Example 2

A composite including a porous substrate formed of a piece of carbon fabric and an electrodeposited compositionally modulated NiFe alloy was formed in a laboratory using the following procedure. A bath was prepared using 0.2M $Ni(H_2NSO_3)_2.4H_2O$, $0.04FeCl_2.4H_2O$, 0.40M $H_3BO_3$, 1.5 g/L sodium saccharin, 0.2 g/L sodium dodecyl sulfate, 1.0 g/L ascorbic acid, and NaOH to attain a pH of 3.00±0.01. A piece of wet laid carbon fabric (commercially available from MarkTek, Inc. of Chesterfield, Mo., part number C10001010T) was attached to the working electrode terminal of the potentiostat. To complete electrical connections between the electrodes and the potentiostat, a 0.5 cm by 2 cm by 3 cm piece of 40 ppi reticulated vitreous carbon was connected to the counter electrode end of the potentiostat using an alligator clip and a saturated calomel electrode (i.e., a SCE) was connected to the reference electrode terminal.

After confirming electrical communication between the potentiostat and the working electrode, counter electrode, and reference electrode, the wet laid carbon fabric, the reticulated vitreous carbon, and the SCE were immersed into the bath.

Once positioned within the bath, a time-varying voltage was applied to the working electrode. The time-varying voltage was designed to have the following waveform characteristics: (1) the voltage versus the SCE varied in accordance with a square-wave having a maximum of −4V and a minimum of −1.5V; (2) a duty cycle of 0.17 with the "off" part of the cycle corresponding to a voltage of −1.5V; and (3) a frequency modulation according to a triangle waveform having a peak of 5.5 Hz, a minimum of 0.02 Hz, and a modulation rate of 0.01 Hz. The time-varying voltage was applied to the working electrode until a total of 10 frequency cycles had passed (i.e., 1,000 seconds of time).

Example 3

A composite including a metallized polyurethane foam substrate and an electrodeposited compositionally modulated NiFe alloy may be formed in a laboratory using the following procedure. A bath is prepared using 0.4M $Ni(H_2NSO_3)_2.4H_2O$, $0.04FeCl_2.4H_2O$, 0.40M $H_3BO_3$, 1.5 g/L sodium saccharin, 0.2 g/L sodium dodecyl sulfate, 1.0 g/L ascorbic acid, and HCl to attain a pH of 3.00±0.01. A 1 cm long, 1 cm wide, and 0.25 cm thick piece of metallized, reticulated polyurethane foam having a pore size of about 450 microns and a specific surface area of approximately 1200 $cm^2/cm^3$ is inserted and secured as the working electrode in a flow cell similar to the flow cell shown in FIG. 11. A piece of 100 ppi reticulated vitreous carbon foam is inserted and secured as the counter electrode in the flow cell. Electrical contact is made between the working electrode and the potentiostat as well as between the counter electrode and the potentiostat. A reference electrode is not used in this example.

After confirming electrical communication between the potentiostat and the working electrode and the counter electrode, a time-varying current is applied to the working electrode to drive the electrodeposition reaction. The time-varying current is designed to have the following waveform characteristics: (1) an amperage varying in accordance with a square-wave with a maximum absolute amperage of −23 A and a minimum absolute amperage of −5 A; (2) a duty cycle of about 11% with the "off" part of the cycle corresponding to an amperage of −5 A; and (3) a frequency modulation according to a triangle waveform having a peak of 1.9 Hz, a minimum of 0.019 Hz, and a modulation rate of 0.0075 Hz. In addition to applying a time-varying current, a time-varying flow rate is also applied to the flow cell through the pump. A control waveform for the flow rate has the following characteristics: (1) a square-wave having a maximum flow rate of 500 mL/min and a minimum flow rate of 2 mL/min is set to control the boundary conditions of flow; (2) a duty cycle of about 11% with the "off" part corresponding to a flow rate of 500 mL/min; and (3) a frequency modulation according to a triangle waveform having a peak of 1.9 Hz, a minimum of 0.019 Hz, and a modulation rate of 0.0075 Hz. The current and flow waveforms should be in-phase with the 500 mL/min flow rate setting corresponding to the −5 A and the 2 mL/min coinciding with −23 A. Both the time-varying current and the time-varying flow being applied to the working electrode until a total of 10 frequency cycles had passed (i.e., 1,333 seconds of time).

Example 4

A composite including a polyurethane, non-conductive foam substrate and an electrodeposited compositionally modulated NiFe alloy may be formed in a laboratory using the following procedure. A bath is prepared using 0.4M Ni(H$_2$NSO$_3$)$_2$.4H$_2$O, 0.04 FeCl$_2$.4H$_2$O, 0.40M H$_3$BO$_3$, 1.5 g/L sodium saccharin, 0.2 g/L sodium dodecyl sulfate, 1.0 g/L ascorbic acid, and HCl to attain a pH of 3.00±0.01. A sheet of stainless steel, serving as the working electrode, is introduced into a flow cell, such as the flow cell shown in FIG. 12. A piece of 100 ppi reticulated polyurethane foam (i.e., the porous non-conductive substrate) is then positioned above and in contact with the working electrode. To complete the cell, a piece of wet laid carbon fibers or an additional steel sheet is positioned on top of the polyurethane foam to serve as the counter electrode. Electrical contact is made between the working electrode and the potentiostat as well as between the counter electrode and the potentiostat. A reference electrode is not used in this example.

After confirming electrical communication between the potentiostat and the working electrode and the counter electrode, a time-varying current is applied to the working electrode to drive the electrodeposition reaction. The time-varying current is designed to have the following waveform characteristics: (1) a current density that varies accordance with a square-wave with a maximum current density of −100 mA/cm$^2$ and minimum current density of −20 mA/cm$^2$; (2) a duty cycle of about 11% with the "off" part of the cycle corresponding to a current density of −20 mA/cm$^2$; and (3) a frequency modulation according to a triangle waveform having a peak of 1.9 Hz, a minimum of 0.019 Hz, and a modulation rate of 0.0075 Hz. In addition to applying a time-varying current, a time-varying flow rate is also applied to the flow cell through the pump. A control waveform for the flow rate has the following characteristics: (1) a square-wave having a maximum flow rate of 636 mL/min and a minimum flow rate of 2.5 mL/min is set to control the boundary conditions of flow; (2) a duty cycle of about 11% with the "off" part corresponding to a flow rate of 636 mL/min; and (3) a frequency modulation according to a triangle waveform having a peak of 1.9 Hz, a minimum of 0.019 Hz, and a modulation rate of 0.0075 Hz. The current and flow waveforms should be in-phase with the 636 mL/min flow rate setting corresponding to the −20 A and the 2.5 mL/min coinciding with −100 A. Both the time-varying current and the time-varying flow being applied to the working electrode until the voltage of the cell reaches 1 mV (indicating that the deposited growth front is approaching the counter electrode).

Example 5

A composite including a bed of conductive metal hollow spheres electrochemically sintered together with an electrodeposited compositionally modulated NiFe alloy may be formed in a laboratory using the following procedure. A bath is prepared using 0.4M Ni(H$_2$NSO$_3$)$_2$.4H$_2$O, 0.04FeCl$_2$.4H$_2$O, 0.40M H$_3$BO$_3$, 1.5 g/L sodium saccharin, 0.2 g/L sodium dodecyl sulfate, 1.0 g/L ascorbic acid, and HCl to attain a pH of 3.00±0.01. A bed of conductive, copper, hollow spheres having a mean diameter of 500 microns and positioned between two porous nonconductive screens is inserted and secured as the working electrode in a flow cell similar to the flow cell shown in FIG. 11. A piece of 100 ppi reticulated vitreous carbon foam is inserted and secured as the counter electrode in the flow cell. Electrical contact is made between the working electrode and the potentiostat as well as between the counter electrode and the potentiostat. A reference electrode is used to monitor the potential of the working electrode.

After confirming electrical communication between the potentiostat and the working electrode, the counter electrode, and the reference electrode, a time-varying current is applied to the working electrode to drive the electrodeposition reaction. The time-varying current is designed to have the following waveform characteristics: (1) a current density varying in accordance with a square-wave with a maximum current density of −100 mA/cm$^2$ and a minimum current density of −20 mA/cm$^2$; (2) a duty cycle of about 11% with the "off" part of the cycle corresponding to a current density of −20 mA/cm$^2$; and (3) a frequency modulation according to a triangle waveform having a peak of 1.9 Hz, a minimum of 0.019 Hz, and a modulation rate of 0.0075 Hz. In addition to applying a time-varying current, a time-varying flow rate is also applied to the flow cell through the pump. A control waveform for the flow rate has the following characteristics: (1) a square-wave having a maximum flow rate of 636 mL/min and a minimum flow rate of 2.5 mL/min is set to control the boundary conditions of flow; (2) a duty cycle of about 11% with the "off" part corresponding to a flow rate of 636 mL/min; and (3) a frequency modulation according to a triangle waveform having a peak of 1.9 Hz, a minimum of 0.019 Hz, and a modulation rate of 0.0075 Hz. The current and flow waveforms should be in-phase with the 636 mL/min flow rate setting corresponding to the −20 mA/cm$^2$ and the 2.5 mL/min coinciding with −100 mA/cm$^2$. Both the time-varying current and the time-varying flow being applied to the working electrode until a total of 40 frequency cycles had passed.

Example 6

A composite including a bed of non-conductive, polymer spheres electrochemically sintered together with an electrodeposited compositionally modulated NiFe alloy may be formed in a laboratory using the following procedure. A bath is prepared using 0.4M Ni(H$_2$NSO$_3$)$_2$.4H$_2$O, 0.04FeCl$_2$.4H$_2$O, 0.40M H$_3$BO$_3$, 1.5 g/L sodium saccharin, 0.2 g/L sodium dodecyl sulfate, 1.0 g/L ascorbic acid, and HCl to attain a pH of 3.00±0.01. A sheet of stainless steel, serving as the working electrode, is introduced into a flow cell, such as the flow cell shown in FIG. 12. A bed of polymer spheres having a mean diameter of about 500 microns are packed on top of the working electrode. To complete the cell, a piece of wet laid carbon fabric or an additional steel sheet is positioned on top of the polymer spheres to serve as the counter electrode. A piece of non-conductive, polymer foam can be used to secure the ends of the particle bed not constrained by the electrodes. Electrical contact is made between the working electrode and the potentiostat as well as between the counter electrode and the potentiostat. A reference electrode is not used in this example.

After confirming electrical communication between the potentiostat and the working electrode and the counter electrode, a time-varying current is applied to the working electrode to drive the electrodeposition reaction. The time-varying current is designed to have the following waveform characteristics: (1) a current density that varies accordance with a square-wave with a maximum current density of −100 mA/cm$^2$ and minimum current density of −20 mA/cm$^2$; (2) a duty cycle of about 11% with the "off" part of the cycle corresponding to a current density of −20 mA/cm$^2$; and (3) a frequency modulation according to a triangle waveform having a peak of 1.9 Hz, a minimum of 0.019 Hz, and a modulation rate of 0.0075 Hz. In addition to applying a time-varying current, a time-varying flow rate is also applied to the flow cell through the pump. A control waveform for the flow rate has the following characteristics: (1) a square-wave having a maximum flow rate of 636 mL/min and a minimum flow rate of 2.5 mL/min is set to control the boundary conditions of flow; (2) a duty cycle of about 11% with the "off" part corresponding to a flow rate of 636 mL/min; and (3) a frequency modulation according to a triangle waveform having a peak of 1.9 Hz, a minimum of 0.019 Hz, and a modulation rate of 0.0075 Hz. The current and flow waveforms should be in-phase with the 636 mL/min flow rate setting corresponding to the −20 A and the 2.5 mL/min coinciding with −100 A. Both the time-varying current and the time-varying flow being applied to the working electrode until the voltage of the cell reaches 1 mV (indicating that the deposited growth front is approaching the counter electrode).

Example 7

A composite including a metallized, polyurethane foam substrate and an compositionally modulated nickel matrix/alumina particle-reinforced material may be formed in a laboratory using the following procedure. A bath is prepared using 3.00 g/L NiSO$_4$.6H$_2$O, 60 g/L NiCl$_2$.6H$_2$O, 40 g/L H$_3$BO$_3$, and 80 g/L of 5 micron sized a-alumina powder. A metallized, reticulated polyurethane foam cylinder having a pore diameter of about 450 microns, a thickness of 0.25 cm, a diameter of 1 cm, and a specific surface area of approximately 1200 cm$^2$/cm$^3$ is inserted and secured as the working electrode in a flow cell similar to the flow cell shown in FIG. 11. A piece of 100 ppi reticulated vitreous carbon foam is inserted and secured as the counter electrode in the flow cell. Electrical contact is made between the working electrode and the potentiostat as well as between the counter electrode and the potentiostat. A reference electrode is used to monitor the potential of the working electrode.

Figure 13A:
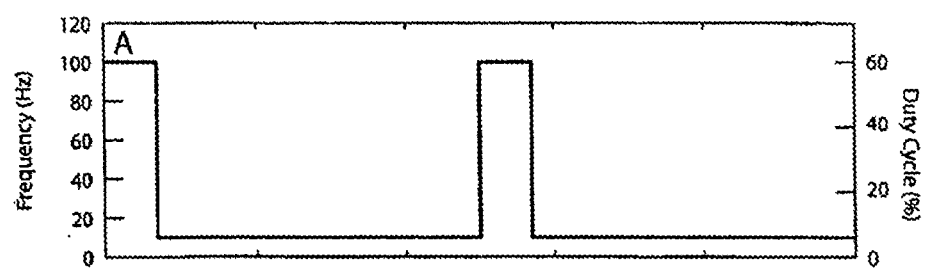
FIGS. 13A, 13B, and 13C illustrate deposition conditions and a resulting compositionally modulating electrodeposit for Example 6.
Figure 13B:
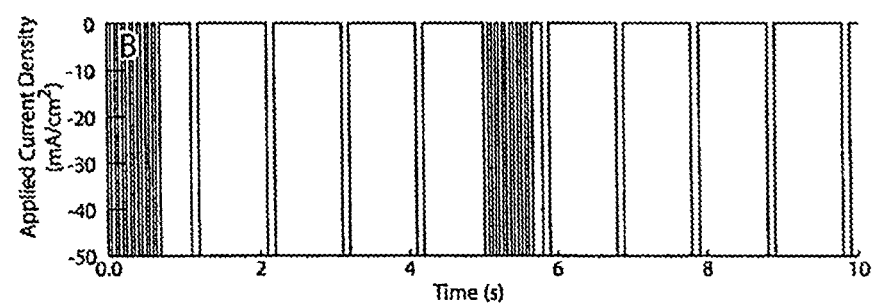
Figure 13C:
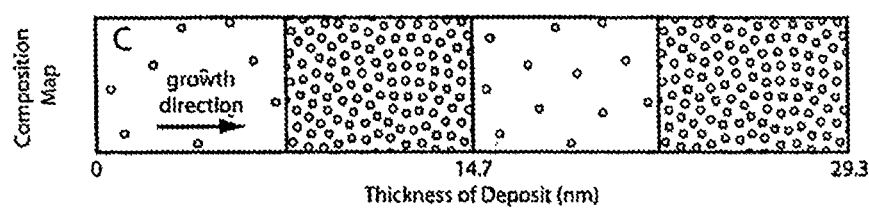

After confirming electrical communication between the potentiostat and the working electrode, the counter electrode, and the reference electrode and setting the pump to a constant flow rate of 50 ML/min, a time-varying current is applied to the working electrode to drive the electrodeposition reaction. The time-varying current is designed to have the following waveform characteristics: (1) a current density varying in accordance with a square-wave with a maximum current density of −50 mA/cm$^2$ and a minimum current density of 0 mA/cm$^2$ with a mean of −25 mA/cm$^2$ and an amplitude of 25 mA/cm$^2$; (2) a frequency modulation according to a square wave form with a mean of 55 Hz, an amplitude of 45 Hz and a modulation frequency of 2 Hz, with a duty cycle of 14% as illustrated in FIG. 13A; and (3) a duty cycle modulation according to a square waveform with a mean of 35%, and an amplitude of 25%, and a modulation frequency of 2% as illustrated in FIG. 13A. The time-varying current (see FIG. 13B) being applied to the working electrode until a total of 10,000 frequency modulation cycles have passed (e.g., 5,000 seconds) to form a compositionally modulated electrodeposit that has a Ni matrix and layers of various concentrations of alumina particles as illustrated in FIG. 13C.

Example 8

A composite for use as a lightweight auto body panel can be manufactured using the following procedure. First, a flexible sheet of nickel foam or a metallized, open cell polymer foam is stamped into a desired auto body panel shape using a light-duty press to create a preform. After obtained the desired shape, the stamped foam is connected to a negative terminal on a power supply. A piece of reticulated vitreous carbon foam of a size similar to the stamped foam is then connected to a positive terminal on the power supply. After confirming electrical communication, the stamped foam and the reticulated vitreous carbon foam are immersed in a 10:1 Ni to Fe bath formed from 0.4M Ni(H$_2$NSO$_3$)$_2$.4H$_2$O, 0.04FeCl$_2$.4H$_2$O, 0.40M H$_3$BO$_3$, 1.5 g/L sodium saccharin, 0.2 g/L sodium dodecyl sulfate, 1.0 g/L ascorbic acid, and HCl to attain a pH of 3.00±0.01. A compositionally modulated Ni$_x$Fe$_{1-x}$ coating is deposited over the entire surface of the stamped foam until 10 to 20% of the interior void space of the stamped foam is filled. The compositionally modulated Ni$_x$Fe$_{1-x}$ coating includes alternating regions of nanolaminates and microlaminates to provide areas of high hardness and high ductility.

After filling 10 to 20% of the interior void space, the current density is increased and deposition is focused on the external surfaces of the stamped panel to close or seal off the interior void structure. A 100 micron coating having both high hardness and toughness properties is deposited on the exterior surface of the stamped foam to complete the body panel.

Example 9

A composite for use as a lightweight body armor can be manufactured using the following procedure. First, a planar sheet of woven carbon fiber is cut into a desired body panel shape. After obtained the desired shape, the cut sheet of carbon fiber is connected to a negative terminal on a power supply. A piece of reticulated vitreous carbon foam of a size similar to the cut sheet of carbon fiber is then connected to a positive terminal on the power supply. After confirming electrical communication, the carbon fiber and the reticulated vitreous carbon foam are immersed in a 10:1 Ni to Fe bath formed from 0.4M Ni(H$_2$NSO$_3$)$_2$.4H$_2$O, 0.04 FeCl$_2$.4H$_2$O, 0.40M H$_3$BO$_3$, 1.5 g/L sodium saccharin, 0.2 g/L sodium dodecyl sulfate, 1.0 g/L ascorbic acid, and HCl to attain a pH of 3.00±0.01. A compositionally modulated Ni$_x$Fe$_{1-x}$ coating is deposited over the entire surface of the sheet of carbon fiber until 10 to 20% of the interior void space of is filled. The compositionally modulated Ni$_x$Fe$_{1-x}$ coating includes alternating regions of nanolaminates and microlaminates to provide areas of high hardness and high ductility.

Next a piece of reticulated metallized elastomeric foam cut to the same shape as the carbon fiber is attached to the 10 to 20% plated carbon fiber workpiece such that their dominant faces are in intimate electrical contact. The workpiece including both the plated carbon fiber sheet and the reticulated metallized elastomeric foam (i.e., a graded porous substrate) is immersed in the 10:1 Ni to Fe bath and electrodeposition of the compositionally modulated $Ni_xFe_{1-x}$ continues until 10 to 20% of void space of the reticulated metallized elastomeric foam is filled.

A piece of conductive, high-hardness reticulated carbon foam such as, for example, CFOAM® (available from Touchstone Research Laboratory, Triadelphia, W. Va.) is cut and electrically joined to the workpiece. The workpiece including the three layers (carbon fiber, reticulated metallized elastomeric foam, and CFOAM®) is immersed in the 10:1 Ni to Fe bath and electrodeposition of the compositionally modulated $Ni_xFe_{1-x}$ continues until 10 to 20% of the void space in the CFOAM® is filled.

After filling 10 to 20% of the interior void space of the entire workpiece, the current density is increased and deposition is focused on the external surface to close or seal off the interior void structure. A 100 micron coating having both high hardness and toughness properties is deposited on the exterior surface of the workpiece to complete the armor body panel.

Example 10

A composite for use as a lightweight golf club shaft can be manufactured using the following procedure. First, a stainless steel mandrel is inserted into the center of a woven carbon fiber sleeve sized to fit snugly around the mandrel. The stainless steel mandrel is then connected to a negative terminal of a power supply. A piece of reticulated vitreous carbon foam of a size similar to the stainless steel mandrel is then connected to a positive terminal on the power supply. After confirming electrical communication, the stainless steel mandrel with woven carbon fiber sleeve and the reticulated vitreous carbon foam are immersed in a 10:1 Ni to Fe bath formed from 0.4M $Ni(H_2NSO_3)_2.4H_2O$, 0.04 $FeCl_2.4H_2O$, 0.40M $H_3BO_3$, 1.5 g/L sodium saccharin, 0.2 g/L sodium dodecyl sulfate, 1.0 g/L ascorbic acid, and HCl to attain a pH of 3.00±0.01. A compositionally modulated $Ni_xFe_{1-x}$ coating is deposited over the entire surface of the woven carbon fiber sleeve until 10 to 20% of the interior void space of the sleeve is filled. The compositionally modulated $Ni_xFe_{1-x}$ coating includes alternating regions of nanolaminates and microlaminates to provide areas of high hardness and high ductility.

After filling 10 to 20% of the interior void space, the current density is increased and deposition is focused on the external surfaces of the sleeve to close or seal off the interior void structure. A 100 micron coating having both high hardness and toughness properties is deposited on the exterior surface of the sleeve to complete the golf shaft.

What is claimed is:

1. A nanolaminate coating, comprising a plurality of nanolaminate layers, each nanolaminate layer of the plurality of nanolaminate layers independently comprising a nickel-cobalt alloy, the plurality of nanolaminate layers comprising nickel-rich layers, a nickel concentration and a cobalt concentration varying between individual nickel-rich layers, the nanolaminate coating being compositionally modulated such that the nickel concentration and the cobalt concentration varies periodically through a thickness of the nanolaminate coating, the nanolaminate coating being shaped by a porous preform comprising a plurality of pores, the nanolaminate coating being on a surface of each of the plurality of pores without completely filling any of the plurality of pores.

2. The nanolaminate coating of claim 1, wherein at least a portion of the plurality of nanolaminate layers further comprises nanosized particles.

3. The nanolaminate coating of claim 1, wherein the plurality of nanolaminate layers comprises at least 100 nanolaminate layers.

4. The nanolaminate coating of claim 1, wherein each nanolaminate layer of the plurality of nanolaminate layers independently has a thickness from about 0.5 nm to 100 nm.

5. An article comprising:
a substrate material comprising a plurality of pores; and
a nanolaminate coating on surfaces of the plurality of pores, the nanolaminate coating partially fills each of the plurality of pores throughout an entire thickness of the substrate material, the nanolaminate coating being compositionally modulated and comprising a plurality of nanolaminate layers, each nanolaminate layer of the plurality of nanolaminate layers independently comprising an alloy of nickel and cobalt, the plurality of nanolaminate layers comprising nickel-rich layers, a nickel concentration and a cobalt concentration varying between individual nickel-rich layers, the nickel concentration and the cobalt concentration varying periodically through a depth of the nanolaminate coating.

6. The article of claim 5, wherein the substrate material is a consolidated material.

7. The article of claim 6, wherein the consolidated material is a foam, a fabric, or a mesh.

8. The article of claim 5, wherein the substrate material is non-conductive.

9. The article of claim 5, wherein the nanolaminate coating covers the surfaces of the plurality of pores.

10. The article of claim 5, wherein each nanolaminate layer of the plurality of nanolaminate layers independently has a thickness from about 0.5 nm to 100 nm.

11. An aircraft comprising:
a light-weight element comprising:
a nanolaminate coating comprising a plurality of nanolaminate layers, each nanolaminate layer of the plurality of nanolaminate layers independently comprising a nickel-cobalt cobalt alloy, the plurality of nanolaminate layers comprising nickel-rich layers, a nickel concentration and a cobalt concentration varying between individual nickel-rich layers, the nickel concentration and the cobalt concentration varying periodically through a depth of the nanolaminate coating, the nanolaminate coating being compositionally modulated and shaped by a porous preform comprising a plurality of pores, wherein a thickness of the nanolaminate coating continuously increases from an interior of the porous preform to an exterior of the porous preform.

12. The aircraft of claim 11, wherein at least a portion of the plurality of nanolaminate layers further comprises nanosized particles.

13. The aircraft of claim 11, wherein the plurality of nanolaminate layers comprises at least 100 nanolaminate layers.

14. The aircraft of claim 11, wherein each nanolaminate layer of the plurality of nanolaminate layers independently has a thickness from about 0.5 nm to 100 nm.

15. The aircraft of claim 11, wherein the nanolaminate coating completely fills a first set of the plurality of pores and partially fills a second set of plurality of pores.

* * * * *